US012689802B2

(12) United States Patent  
Giladi et al.

(10) Patent No.: US 12,689,802 B2  
(45) Date of Patent: Jul. 21, 2026

(54) METHODS AND SYSTEMS FOR LOW LATENCY STREAMING

(71) Applicant: Comcast Cable Communications, LLC, Philadelphia, PA (US)

(72) Inventors: Alexander Giladi, Princeton, NJ (US); Ali Cengiz Begen, Meram (TR)

(73) Assignee: Comcast Cable Communications, LLC, Philadelphia, PA (US)

( * ) Notice: Subject to any disclaimer, the term of this patent is extended or adjusted under 35 U.S.C. 154(b) by 101 days.

(21) Appl. No.: 18/178,932

(22) Filed: Mar. 6, 2023

(65) Prior Publication Data

US 2023/0269413 A1 Aug. 24, 2023

Related U.S. Application Data

(63) Continuation of application No. 16/942,491, filed on Jul. 29, 2020, now Pat. No. 11,647,242.

(60) Provisional application No. 62/880,569, filed on Jul. 30, 2019.

(51) Int. Cl.
| | |
|---|---|
| *H04N 21/462* | (2011.01) |
| *H04L 65/612* | (2022.01) |
| *H04L 65/613* | (2022.01) |
| *H04L 65/70* | (2022.01) |
| *H04N 21/2187* | (2011.01) |
| *H04N 21/24* | (2011.01) |
| *H04N 21/2662* | (2011.01) |
| *H04N 21/643* | (2011.01) |

(52) U.S. Cl.
CPC ....... *H04N 21/4621* (2013.01); *H04L 65/612* (2022.05); *H04L 65/613* (2022.05); *H04L 65/70* (2022.05); *H04N 21/2187* (2013.01);

*H04N 21/2402* (2013.01); *H04N 21/2662* (2013.01); *H04N 21/64322* (2013.01)

(58) Field of Classification Search
CPC .......... H04N 21/2662; H04N 21/2187; H04N 21/2402; H04N 21/64322; H04N 21/4621; H04N 21/44209; H04N 21/8456; H04N 21/2381; H04N 21/23406; H04N 21/23439; H04N 21/23608; H04N 21/2365; H04N 21/23805; H04N 21/2383; H04N 21/8547; H04L 65/612; H04L 65/613; H04L 65/70; H04L 43/0894; H04L 65/80; H04L 43/0882
USPC ........................................ 709/231, 237, 234
See application file for complete search history.

(56) References Cited

U.S. PATENT DOCUMENTS

| | | | |
|---|---|---|---|
| 8,874,779 B2 * | 10/2014 | Ma ..................... | H04N 21/8456 709/200 |
| 2006/0039675 A1 | 2/2006 | Kim et al. | |
| 2007/0115849 A1 | 5/2007 | Ekelin et al. | |
| 2010/0150171 A1* | 6/2010 | Rodbro .............. | H04L 43/0852 370/468 |
| 2012/0011267 A1* | 1/2012 | Ma ......................... | H04L 65/70 709/231 |
| 2013/0007263 A1 | 1/2013 | Soroushian et al. | |
| 2013/0097309 A1 | 4/2013 | Ma et al. | |

(Continued)

*Primary Examiner* — Tan Doan

(74) *Attorney, Agent, or Firm* — Ballard Spahr LLP

(57) ABSTRACT

Methods and systems are described for low latency streaming. A computing device may receive a chunk of content. The computing device may determine whether a transmission duration of the chunk of the content satisfies a threshold. The computing device may determine a bitrate based on the transmission duration satisfying a threshold.

32 Claims, 14 Drawing Sheets

(56) References Cited

U.S. PATENT DOCUMENTS

| | | | |
|---|---|---|---|
| 2013/0138828 A1* | 5/2013 | Strasman | H04N 21/8456 |
| | | | 709/231 |
| 2014/0123202 A1 | 5/2014 | Gautier et al. | |
| 2014/0189052 A1 | 7/2014 | Gholmieh et al. | |
| 2017/0064342 A1* | 3/2017 | Botsford | H04N 21/2381 |
| 2018/0027040 A1 | 1/2018 | Bae | |
| 2018/0041561 A1 | 2/2018 | Davies et al. | |
| 2018/0375780 A1 | 12/2018 | Sawabe | |
| 2019/0230010 A1 | 7/2019 | Guo et al. | |
| 2020/0304849 A1* | 9/2020 | Hassler | H04N 21/44004 |

\* cited by examiner

200

Computing Device 204
- Communication Element 222
- Address Element 224
- ABR Software 226
- Drift Control Module 228
- Identifier 230

Network 206

User Device 202
- Communication Element 210
- Address Element 212
- Service Element 214
- ABR Software 216
- Drift Control Module 218
- Identifier 220

900

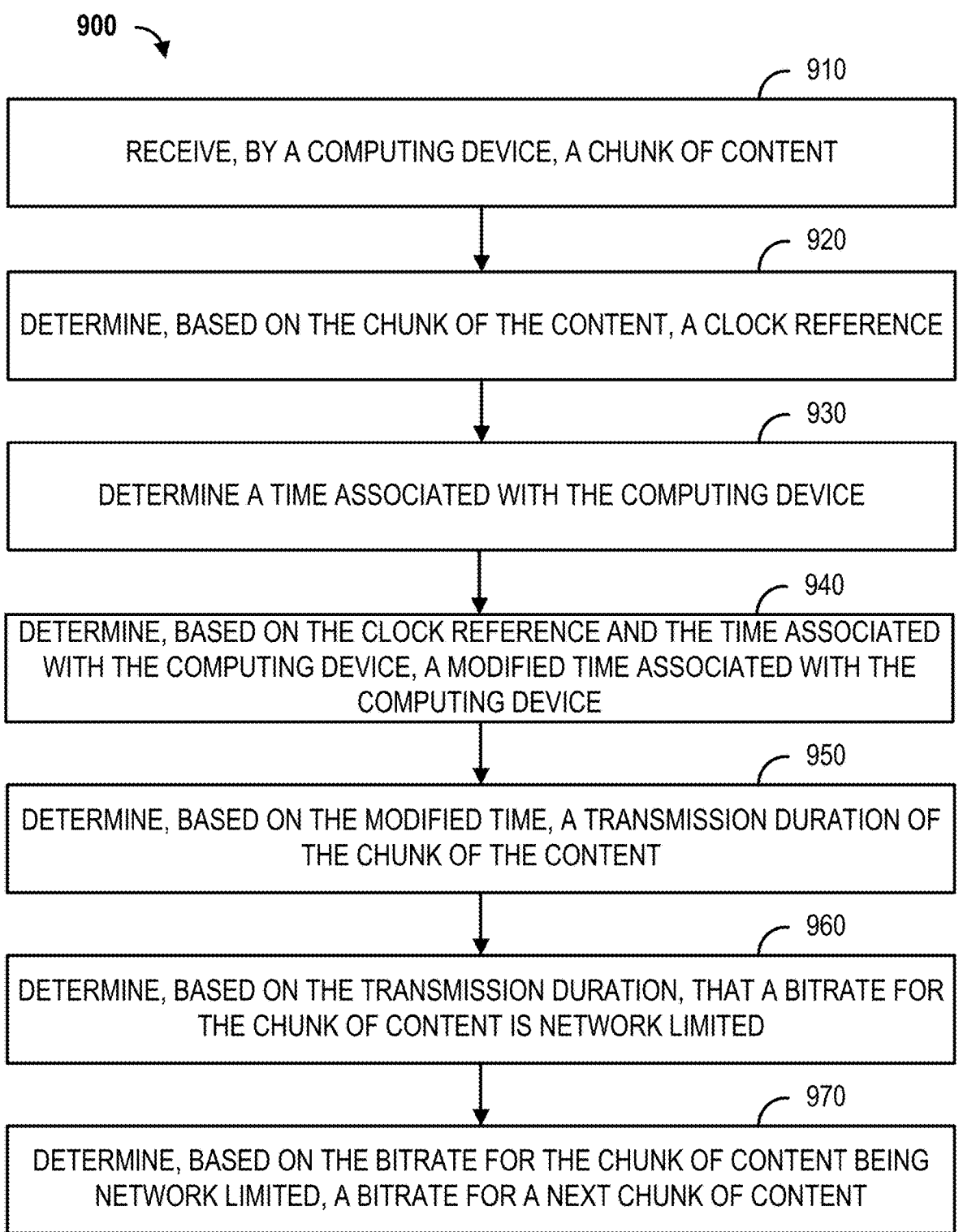

910

RECEIVE, BY A COMPUTING DEVICE, A CHUNK OF CONTENT

920

DETERMINE, BASED ON THE CHUNK OF THE CONTENT, A CLOCK REFERENCE

930

DETERMINE A TIME ASSOCIATED WITH THE COMPUTING DEVICE

940

DETERMINE, BASED ON THE CLOCK REFERENCE AND THE TIME ASSOCIATED WITH THE COMPUTING DEVICE, A MODIFIED TIME ASSOCIATED WITH THE COMPUTING DEVICE

950

DETERMINE, BASED ON THE MODIFIED TIME, A TRANSMISSION DURATION OF THE CHUNK OF THE CONTENT

960

DETERMINE, BASED ON THE TRANSMISSION DURATION, THAT A BITRATE FOR THE CHUNK OF CONTENT IS NETWORK LIMITED

970

DETERMINE, BASED ON THE BITRATE FOR THE CHUNK OF CONTENT BEING NETWORK LIMITED, A BITRATE FOR A NEXT CHUNK OF CONTENT

FIG. 9

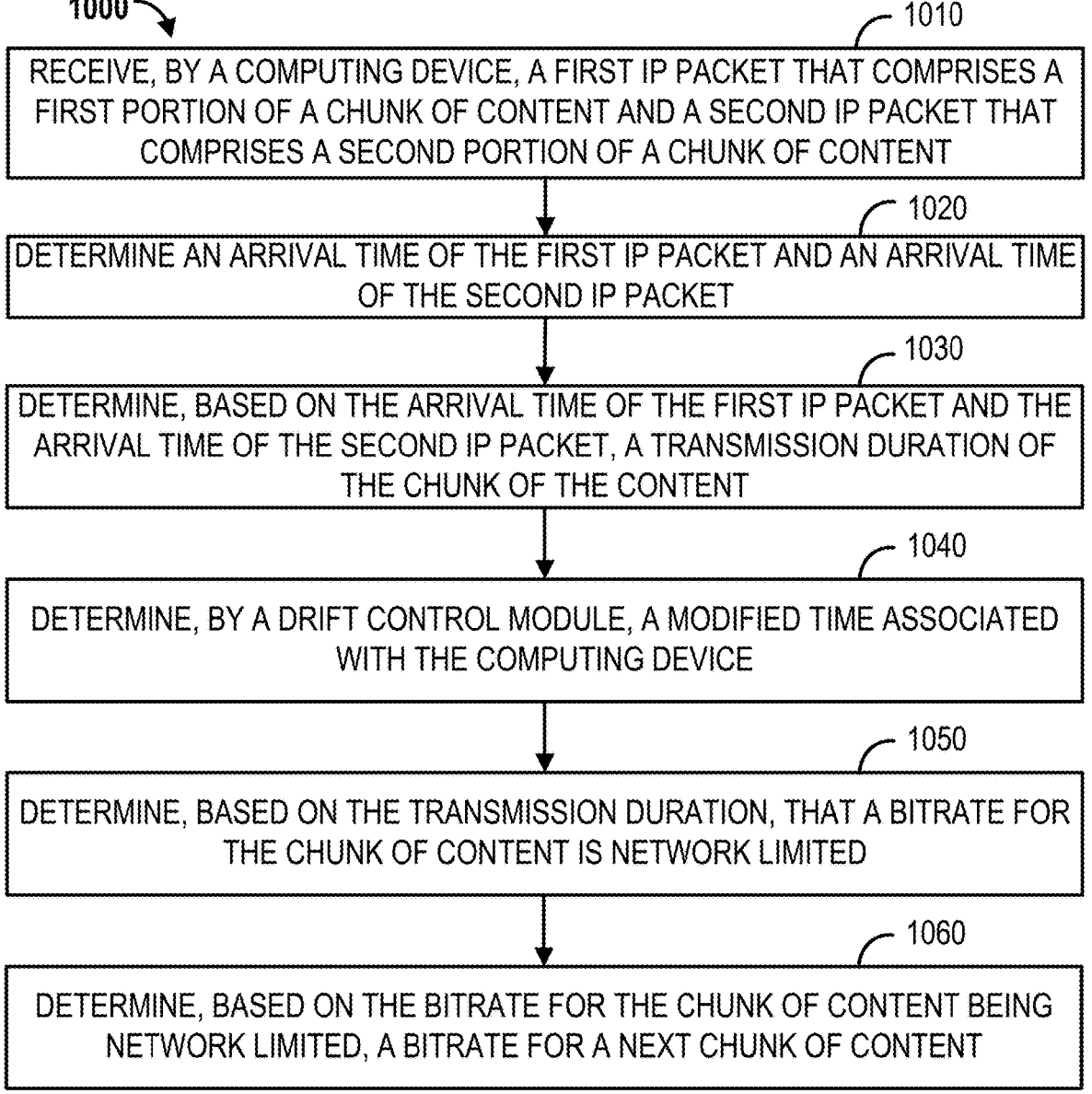

1000

1010
RECEIVE, BY A COMPUTING DEVICE, A FIRST IP PACKET THAT COMPRISES A FIRST PORTION OF A CHUNK OF CONTENT AND A SECOND IP PACKET THAT COMPRISES A SECOND PORTION OF A CHUNK OF CONTENT

1020
DETERMINE AN ARRIVAL TIME OF THE FIRST IP PACKET AND AN ARRIVAL TIME OF THE SECOND IP PACKET

1030
DETERMINE, BASED ON THE ARRIVAL TIME OF THE FIRST IP PACKET AND THE ARRIVAL TIME OF THE SECOND IP PACKET, A TRANSMISSION DURATION OF THE CHUNK OF THE CONTENT

1040
DETERMINE, BY A DRIFT CONTROL MODULE, A MODIFIED TIME ASSOCIATED WITH THE COMPUTING DEVICE

1050
DETERMINE, BASED ON THE TRANSMISSION DURATION, THAT A BITRATE FOR THE CHUNK OF CONTENT IS NETWORK LIMITED

1060
DETERMINE, BASED ON THE BITRATE FOR THE CHUNK OF CONTENT BEING NETWORK LIMITED, A BITRATE FOR A NEXT CHUNK OF CONTENT

FIG. 10

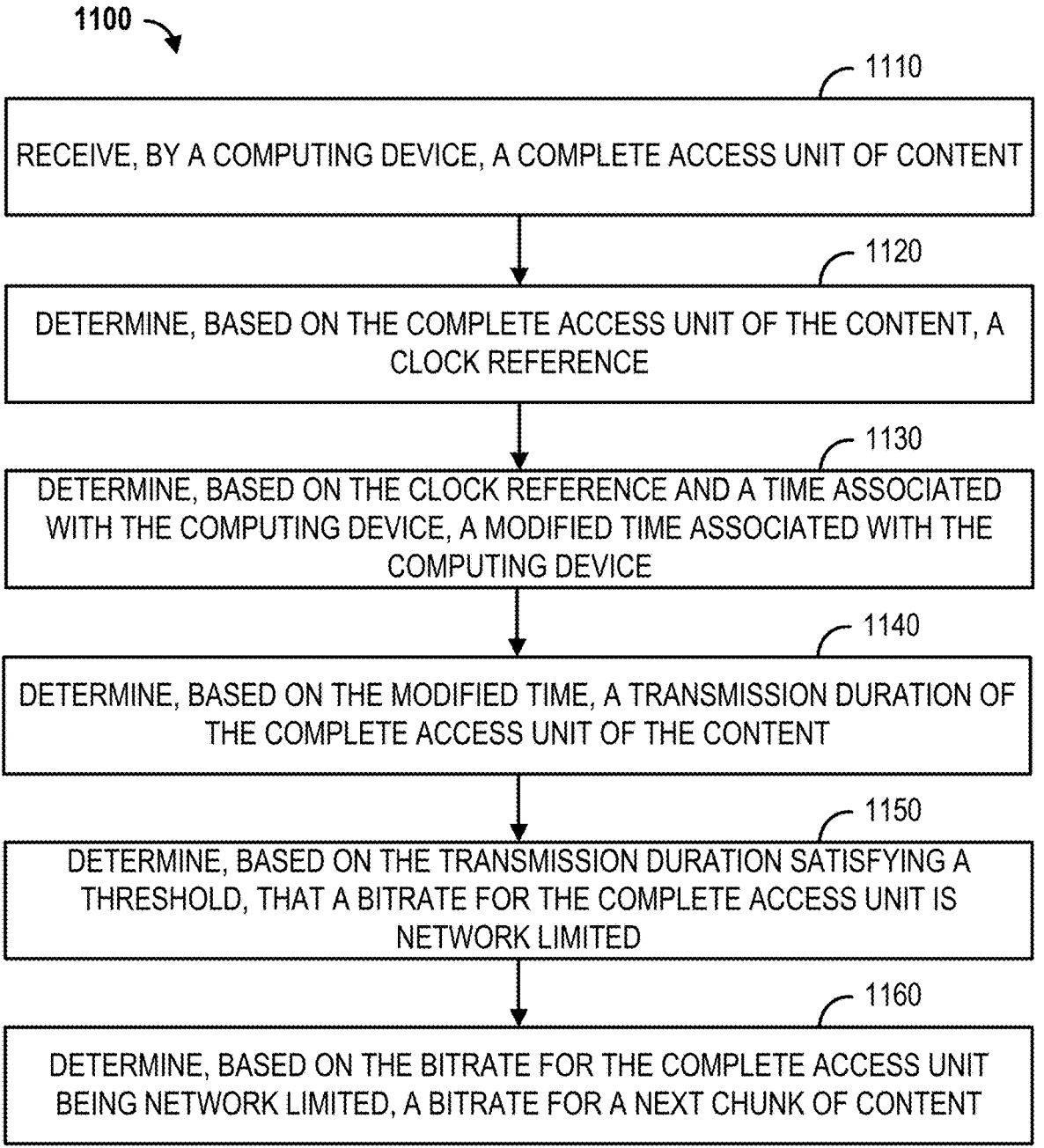

1100

1110

RECEIVE, BY A COMPUTING DEVICE, A COMPLETE ACCESS UNIT OF CONTENT

1120

DETERMINE, BASED ON THE COMPLETE ACCESS UNIT OF THE CONTENT, A CLOCK REFERENCE

1130

DETERMINE, BASED ON THE CLOCK REFERENCE AND A TIME ASSOCIATED WITH THE COMPUTING DEVICE, A MODIFIED TIME ASSOCIATED WITH THE COMPUTING DEVICE

1140

DETERMINE, BASED ON THE MODIFIED TIME, A TRANSMISSION DURATION OF THE COMPLETE ACCESS UNIT OF THE CONTENT

1150

DETERMINE, BASED ON THE TRANSMISSION DURATION SATISFYING A THRESHOLD, THAT A BITRATE FOR THE COMPLETE ACCESS UNIT IS NETWORK LIMITED

1160

DETERMINE, BASED ON THE BITRATE FOR THE COMPLETE ACCESS UNIT BEING NETWORK LIMITED, A BITRATE FOR A NEXT CHUNK OF CONTENT

FIG. 11

METHODS AND SYSTEMS FOR LOW LATENCY STREAMING

CROSS REFERENCE TO RELATED PATENT APPLICATION

This application is a continuation of U.S. application Ser. No. 16/942,491, filed Jul. 29, 2020, which claims the benefit of U.S. Provisional Application No. 62/880,569 filed Jul. 30, 2019, which are incorporated herein by reference in their entirety.

BACKGROUND

One protocol to provide streaming content to users is HTTP adaptive streaming (HAS). When utilizing HAS, content is divided into short duration segments that may be encoded at different bitrates and resolutions. The short duration segments may then be offered as HTTP objects to user devices (e.g., streaming clients), which the user device may request. The user device may utilize Adaptive Bitrate (ABR) to pick the segments that may present the best experience for a user of the user device. For example, the user device may take into account network bandwidth, as well as the capabilities of the user device, when determining the best segment to select. Further, HAS may be utilized with chunked transfer encoding to offer low latency streaming to user devices. By utilizing chunked transfer encoding, content may be generated and sent at the same time, which reduces latency. For example, during televised live events (e.g., sporting events), delivering the live content as quickly as possible to the user (e.g., minimizing the delay between the live event and when the event is viewed by the user) is desirable to improve the user's quality of experience. However, conventional ABR protocols do not work well when utilizing chunked encoding due to the presence of idle periods between the chunks being received by the user device, which results in an inaccurate determination of network bandwidth. The inaccurate determination of the network bandwidth causes the ABR protocols to make poor ABR decisions (e.g., which bitrate is best based on the network bandwidth and the user device).

SUMMARY

It is to be understood that both the following general description and the following detailed description are exemplary and explanatory only and are not restrictive. Methods and systems for low latency streaming are described. A computing device may receive a chunk of content. The computing device may determine a clock reference from the chunk of the content. The computing device may utilize the clock reference and a wall clock time (e.g., a time that is local, relative, and/or specific to the computing device determined from an internal clock of the computing device, etc.) to determine a modified wall clock time. The modified wall clock time may synchronize a clock (e.g., internal clock, etc.) of the computing device with a clock of the device sending the content. The computing device may determine a transmission duration of the chunk of the content by utilizing the modified wall clock time and a media clock associated with the content. The computing device may determine whether the chunk of the content is network limited or source limited. If the chunk of the content is network limited, the computing device may determine a bandwidth of the network and may utilize the bandwidth of the network to request a bitrate for a next chunk of content.

For example, the computing device may utilize an Adaptive Bitrate (ABR) protocol when requesting content. Thus, the computing device may determine whether a chunk of content may accurately reflect the bandwidth of the network, determine the bandwidth of the network based on the transmission duration of the chunk of the content, and may a determination about a bitrate to request for a next chunk of content.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, show examples and together with the description, serve to explain the principles of the methods and systems:

FIG. 9 shows a flowchart of an example method for low latency streaming;

FIG. 10 shows a flowchart of an example method for low latency streaming;

FIG. 11 shows a flowchart of an example method for low latency streaming; and

DETAILED DESCRIPTION

Figure 1:
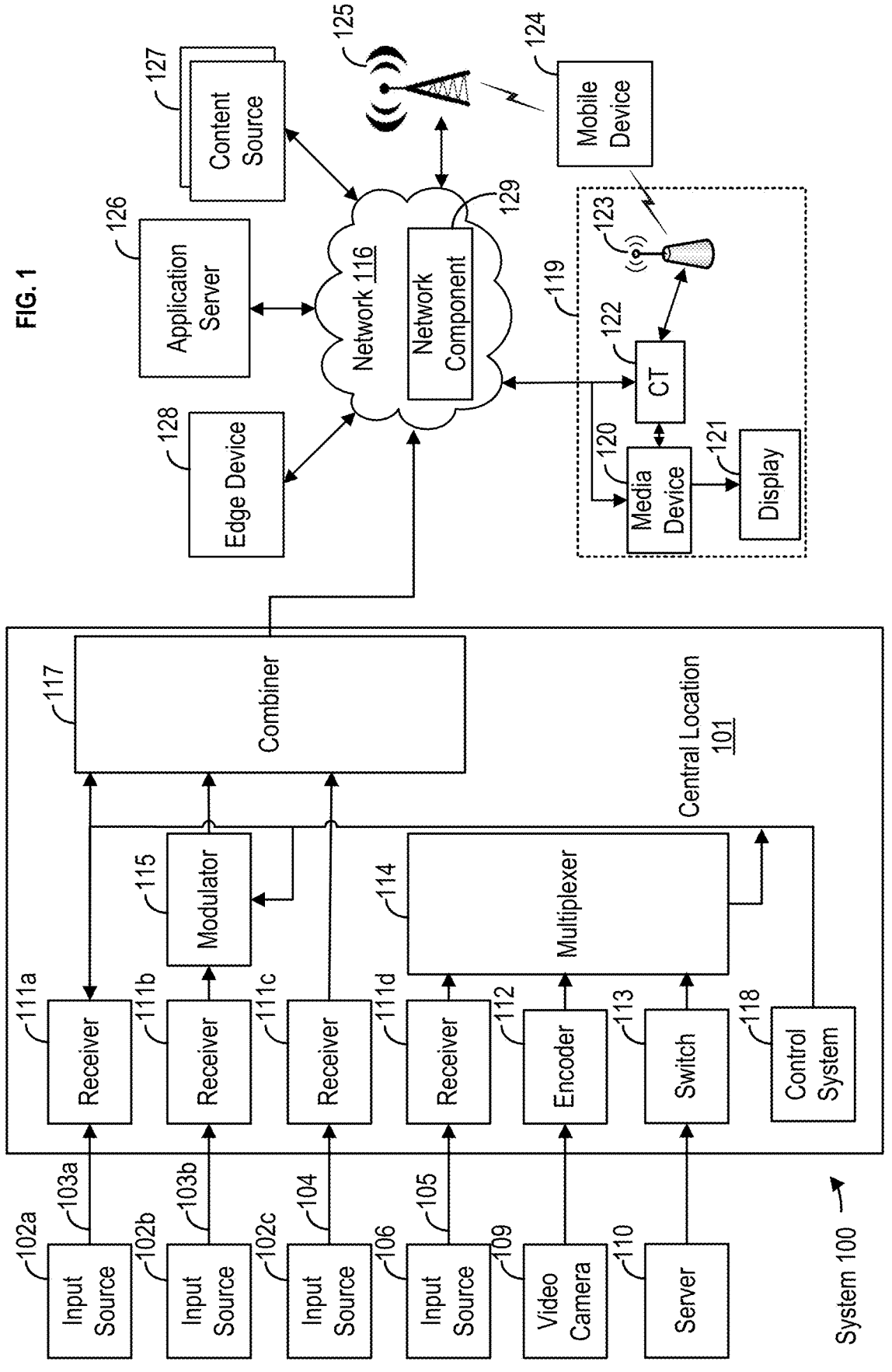
FIG. 1 shows an example system for low latency streaming.

Before the present methods and systems are disclosed and described, it is to be understood that the methods and systems are not limited to specific methods, specific components, or to particular implementations. It is also to be understood that the terminology used herein is for the purpose of describing particular examples only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. When values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

"Content items," as the phrase is used herein, may also be referred to as "content," "content data," "content information," "content asset," "multimedia asset data file," or simply "data" or "information". Content items may be any information or data that may be licensed to one or more individuals (or other entities, such as business or group). Content may be electronic representations of video, audio, text and/or graphics, which may be but is not limited to electronic representations of videos, movies, or other multimedia, which may be but is not limited to data files adhering to MPEG2, MPEG, MPEG4 UHD, HDR, 4k, Adobe® Flash® Video (.FLV) format or some other video file format whether such format is presently known or developed in the future. The content items described herein may be electronic representations of music, spoken words, or other audio, which may be but is not limited to data files adhering to the MPEG-1 Audio Layer 3 (.MP3) format, Adobe®, CableLabs 1.0,1.1, 3.0, AVC, HEVC, H.264, Nielsen watermarks, V-chip data and Secondary Audio Programs (SAP). Sound Document (.ASND) format or some other format configured to store electronic audio whether such format is presently known or developed in the future. In some cases, content may be data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic ad insertion data (.csv), Adobe® Photoshop® (.PSD) format or some other format for electronically storing text, graphics and/or other information whether such format is presently known or developed in the future. Content items may be any combination of the above-described formats.

This detailed description may refer to a given entity performing some action. It should be understood that this language may in some cases mean that a system (e.g., a computer) owned and/or controlled by the given entity is actually performing the action.

When utilizing chunk encoding to provide low latency content, delivery of some of the chunks of the content will be source limited (e.g., limited by a device that is the source of the content), whereas delivery of some of the chunks will be network limited (e.g., limited by the bandwidth of the network). Accordingly, accurate bandwidth prediction is critical for high quality adaptive streaming. Thus, the chunks that are source limited may be ignored (e.g., discarded) when determining the bandwidth of the network because the source limited chunks do not accurately indicate the network bandwidth.

To more accurately determine which chunks are network limited versus source limited, a clock reference encoded within the chunks may be utilized. For example, when a user device downloads a chunk of content, a clock reference and a media timestamp may be extracted from the chunk of the content. For example, when utilizing ISO Base Media File Format (ISO-BMFF), the clock reference may by indicated by the 'prft' box, while the media timestamp may be indicated by the 'tfdt' box. The user device may send the clock reference to a drift correction module. For example, after determining the media timestamp and the clock reference, the user device may utilize the drift correction module to synchronize a clock time of the user device with the clock time of the source device (e.g., an encoder). For example, the drift correction module may measure a time difference between adjacent clock references (e.g., adjacent clock references in adjacent chunks of content), and the respective arrival times of the chunks of content. The drift correction module may use the time difference to determine an estimate of the source device's clock. The drift correction module may determine an adjusted wall clock time based on the estimate of the source device's wall clock (e.g., an internal clock of the source device, etc.). That is, the drift correction module may adjust the wall clock time of the user device such that the user device's wall clock time is synchronized with the source device's clock.

The user device may utilize the adjusted wall clock time to determine whether a chunk of content is network limited or is source limited. For example, the user device the chunk transmission duration may be determined based on the adjusted wall clock time. The chunk transmission duration may be compared to the chunk duration in media time. If the chunk duration in media time is within a threshold of the chunk transmission duration (e.g., the chunk duration in media time satisfies the threshold), the chunk may be determined as source limited. Thus, the user device may not utilize the chunk in determining the network bandwidth. Alternatively, if the chunk duration in media time is not within the threshold (e.g., does not satisfy the threshold), the chunk may be determined as network limited. Thus, the user device may utilize the chunk in determining the network bandwidth.

The user device may utilize timestamps to determine whether a chunk is network limited or is source limited. For example, the user device may utilize a network interface card to determine the timestamps. For example, the user device may determine an arrival time of a first IP packet (e.g., an Ethernet frame) that comprises a beginning of the chunk an content. Further, the user device may determine an arrival time of the last IP packet of the chunk. The user device may utilize these two arrival times to determine a length of time required to download the chunk of content. The user device may determine based on the length of time required to download the chunk of content whether the chunk is network limited or source limited. For example, the user device may utilize an arrival time of complete access units to determine a length of time required to download the chunk of content. For example, the user device may utilize a period of time between arrival of a first IP packet of the chunk and arrival of a last IP packet of the chunk. The user device may also utilize a decoding time of the first IP packet of the chunk and a decoding time of the last IP packet of the chunk to determine whether the chunk is network limited or source limited.

FIG. 1 shows an example system 100 for low latency streaming. Those skilled in the art will appreciate that the methods described herein may be used in systems that employ both digital and analog equipment. One skilled in the art will appreciate that provided herein is a functional description and that the respective functions may be performed by software, hardware, or a combination of software and hardware.

The system 100 may have a central location 101 (e.g., a headend), which may receive content (e.g., data, input programming, and the like) from multiple sources. The central location 101 may combine the content from the various sources and may distribute the content to user (e.g., subscriber) locations (e.g., location 119) via a network 116 (e.g., content distribution and/or access system).

The central location 101 may receive content from a variety of sources 102a, 102b, and 102c. The content may be sent from the source to the central location 101 via a variety of transmission paths, including wireless (e.g., satellite paths 103a, 103b) and a terrestrial path 104. The central location 101 may also receive content from a direct feed source 106 via a direct line 105. Other input sources may be capture devices such as a video camera 109 or a server 110. The signals provided by the content sources may include a single content item, a portion of a content item (e.g., content fragment, content portion, content section), a content stream, a plurality of content streams, a multiplex that includes several content items, and/or the like. The plurality of content streams may have different bitrates, framerates, resolutions, codecs, languages, and so forth. The signals provided by the content sources may be video frames and audio frames that have metadata. The metadata of the video frames and the audio frames may be used to determine, and correct if necessary, a synchronization error between the video frames and the audio frames.

The central location 101 may be one or a plurality of receivers 111a, 111b, 111c, 111d that are each associated with an input source. MPEG encoders such as encoder 112, are included for encoding local content or a video camera 109 feed. A switch 113 may provide access to server 110, which may be a Pay-Per-View server, a data server, an internet router, a network system, a phone system, and the like. Some signals may require additional processing, such as signal multiplexing, prior to being modulated. Such multiplexing may be performed by multiplexer (mux) 114.

Data may be inserted into the content at the central location 101 by a device (e.g., the encoder 112, the multiplexer 114, the modulator 115, and/or the combiner 117). The data may be metadata. The device may encode data into the content. The metadata may be inserted by the device in a Moving Picture Experts Group (MPEG) bitstream, MPEG Supplemental Enhancement Information (SEI) messages, MPEG-2 Transport Stream (TS) packet, MPEG-2 Packetized Elementary Stream (PES) header data, ISO Base Media File Format (BMFF) data, ISO BMFF box, or any in any data packet. The metadata may be inserted at the input or output associated with an encoder and/or transcoder, such as a MPEG encoder and/or transcoder. The metadata may also be inserted at other stages in a content distribution network such as at a packager, at a cache device associated with the content distribution network, at an input to the client device, or by any device at any point along the content distribution.

The central location 101 may be one or more modulators 115 for interfacing to a network 116. The modulators 115 may convert the received content into a modulated output signal suitable for transmission over the network 116. The output signals from the modulators 115 may be combined, using equipment such as a combiner 117, for input into the network 116.

The network 116 may be a content delivery network, a content access network, and/or the like. The network 116 may be configured to provide content from a variety of sources using a variety of network paths, protocols, devices, and/or the like. The content delivery network and/or content access network may be managed (e.g., deployed, serviced) by a content provider, a service provider, and/or the like. The network 116 may facilitate delivery of audio content and video content. The audio content may be sent in one or more streams of content. The one or more streams of audio content may have different bitrates, framerates, resolutions, codecs, languages, and so forth. The video content may be sent in one or more streams of content. The one or more streams of video content may have different bitrates, framerates, resolutions, codecs, languages, and so forth. The audio content may be audio frames, and the video content may be video frames.

A control system 118 may permit a system operator to control and monitor the functions and performance of system 100. The control system 118 may interface, monitor, and/or control a variety of functions, including, but not limited to, the channel lineup for the television system, billing for each user, conditional access for content distributed to users, and the like. The control system 118 may provide input to the modulators 115 for setting operating parameters, such as system specific MPEG table packet organization or conditional access information. The control system 118 may be located at the central location 101 or at a remote location.

The network 116 may distribute signals from the central location 101 to user locations, such as a user location 119. The signals may be one or more streams of content. The streams of content may be audio content and/or video content. The audio content may have a stream separate from the video content. The network 116 may be an optical fiber network, a coaxial cable network, a hybrid fiber-coaxial network, a wireless network, a satellite system, a direct broadcast system, an Ethernet network, a high-definition multimedia interface network, a Universal Serial Bus (USB) network, or any combination thereof.

A multitude of users may be connected to the network 116 at one or more of the user locations. At the user location 119, a media device 120 may demodulate and/or decode (e.g., determine one or more audio frames and video frames), if needed, the signals for display on a display device 121, such as on a television set (TV) or a computer monitor. The media device 120 may be a demodulator, decoder, frequency tuner, and/or the like. The media device 120 may be directly connected to the network (e.g., for communications via in-band and/or out-of-band signals of a content delivery network) and/or connected to the network 116 via a communication terminal 122 (e.g., for communications via a packet switched network). The media device 120 may be a set-top box, a digital streaming device, a gaming device, a media storage device, a digital recording device, a combination thereof, and/or the like. The media device 120 may receive content and cause the output of the content on the display device 121. The media device 120 may have one or more applications, such as content viewers, social media applications, news applications, gaming applications, content stores, electronic program guides, and/or the like. Those skilled in the art will appreciate that the signal may be demodulated and/or decoded in a variety of equipment, including the communication terminal 122, a computer, a TV, a monitor, or a satellite dish.

The communication terminal 122 may be located at the user location 119. The communication terminal 122 may be configured to communicate with the network 116. The communication terminal 122 may be a modem (e.g., cable modem), a router, a gateway, a switch, a network terminal (e.g., optical network unit), and/or the like. The communication terminal 122 may be configured for communication with the network 116 via a variety of protocols, such as internet protocol, transmission control protocol, file transfer protocol, session initiation protocol, voice over internet protocol, and/or the like. For a cable network, the communication terminal 122 may be configured to provide network access via a variety of communication protocols and standards, such as Data Over Cable Service Interface Specification (DOCSIS).

The user location 119 may have a first access point 123, such as a wireless access point. The first access point 123 may be configured to provide one or more wireless networks in at least a portion of the user location 119. The first access point 123 may be configured to provide access to the network 116 to devices configured with a compatible wireless radio, such as a mobile device 124, the media device 120, the display device 121, or other computing devices (e.g., laptops, sensor devices, security devices). The first access point 123 may provide a user managed network (e.g., local area network), a service provider managed network (e.g., public network for users of the service provider), and/or the like. It should be noted that in some configurations, some or all of the first access point 123, the communication terminal 122, the media device 120, and the display device 121 may be implemented as a single device.

The user location 119 may not be fixed. A user may receive content from the network 116 on the mobile device 124. The mobile device 124 may be a laptop computer, a tablet device, a computer station, a personal data assistant (PDA), a smart device (e.g., smart phone, smart apparel, smart watch, smart glasses), GPS, a vehicle entertainment system, a portable media player, a combination thereof, and/or the like. The mobile device 124 may communicate with a variety of access points (e.g., at different times and locations or simultaneously if within range of multiple access points). The mobile device 124 may communicate with a second access point 125. The second access point 125 may be a cell tower, a wireless hotspot, another mobile device, and/or other remote access point. The second access point 125 may be within range of the user location 119 or remote from the user location 119. The second access point 125 may be located along a travel route, within a business or residence, or other useful locations (e.g., travel stop, city center, park).

The system 100 may have an application server 126. The application server 126 may provide services related to applications. The application server 126 may have an application store. The application store may be configured to allow users to purchase, download, install, upgrade, and/or otherwise manage applications. The application server 126 may be configured to allow users to download applications to a device, such as the mobile device 124, communications terminal 122, the media device 120, the display device 121, and/or the like. The application server 126 may run one or more application services to provide data, handle requests, and/or otherwise facilitate operation of applications for the user.

The system 100 may have one or more content sources 127. The content source 127 may be configured to provide content (e.g., video, audio, games, applications, data) to the user. The content source 127 may be configured to provide streaming media, such as on-demand content (e.g., video on-demand), content recordings, and/or the like. The content source 127 may be managed by third party content providers, service providers, online content providers, over-the-top content providers, and/or the like. The content may be provided via a subscription, by individual item purchase or rental, and/or the like. The content source 127 may be configured to provide the content via a packet switched network path, such as via an internet protocol (IP) based connection. The content may be accessed by users via applications, such as mobile applications, television applications, set-top box applications, gaming device applications, and/or the like. An application may be a custom application (e.g., by content provider, for a specific device), a general content browser (e.g., web browser), an electronic program guide, and/or the like.

Data may be inserted into the content at the content source 127. The data may be metadata. The content source 127 may encode data into the content. The metadata may be inserted by the device in a Moving Picture Experts Group (MPEG) bitstream, MPEG Supplemental Enhancement Information (SEI) messages, MPEG-2 Transport Stream (TS) packet, MPEG-2 Packetized Elementary Stream (PES) header data, ISO Base Media File Format (BMFF) data, ISO BMFF box, or any in any data packet. The metadata may be inserted at the input or output associated with content source 127. The metadata may also be inserted at other stages in a content distribution network such as at a packager, at a cache device associated with the content distribution network, at an input to the client device, or by any device at any point along the content distribution. While the content source 127 has been described as providing the audio content and video content, as well as encoding the metadata, for ease of explanation, a person of ordinary skill in the art would appreciate that any device in the system 100 may provide the content as well as encode the metadata such as, the edge device 128, described further below.

The system 100 may have an edge device 128. The edge device 128 may be configured to provide content, services, and/or the like to the user location 119. The edge device 128 may be one of a plurality of edge devices distributed across the network 116. The edge device 128 may be located in a region proximate to the user location 119. A request for content from the user may be directed to the edge device 128 (e.g., due to the location of the edge device and/or network conditions). The edge device 128 may be configured to package content for delivery to the user (e.g., in a specific format requested by a user device), provide the user a manifest file (e.g., or other index file describing portions of the content), provide streaming content (e.g., unicast, multicast), provide a file transfer, and/or the like. The edge device 128 may cache or otherwise store content (e.g., frequently requested content) to enable faster delivery of content to users.

The network 116 may have a network component 129. The network component 129 may be any device, module, and/or the like communicatively coupled to the network 116. The network component 129 may also be a router, a switch, a splitter, a packager, a gateway, an encoder, a storage device, a multiplexer, a network access location (e.g., tap), physical link, and/or the like.

Any of the application server 126, the content source 127, the edge device 128, and/or the media device 120 may serve as a server relative to a user device, such as the media device 120 and/or the mobile device 124, and may provide the content to the user device.

Figure 2A:
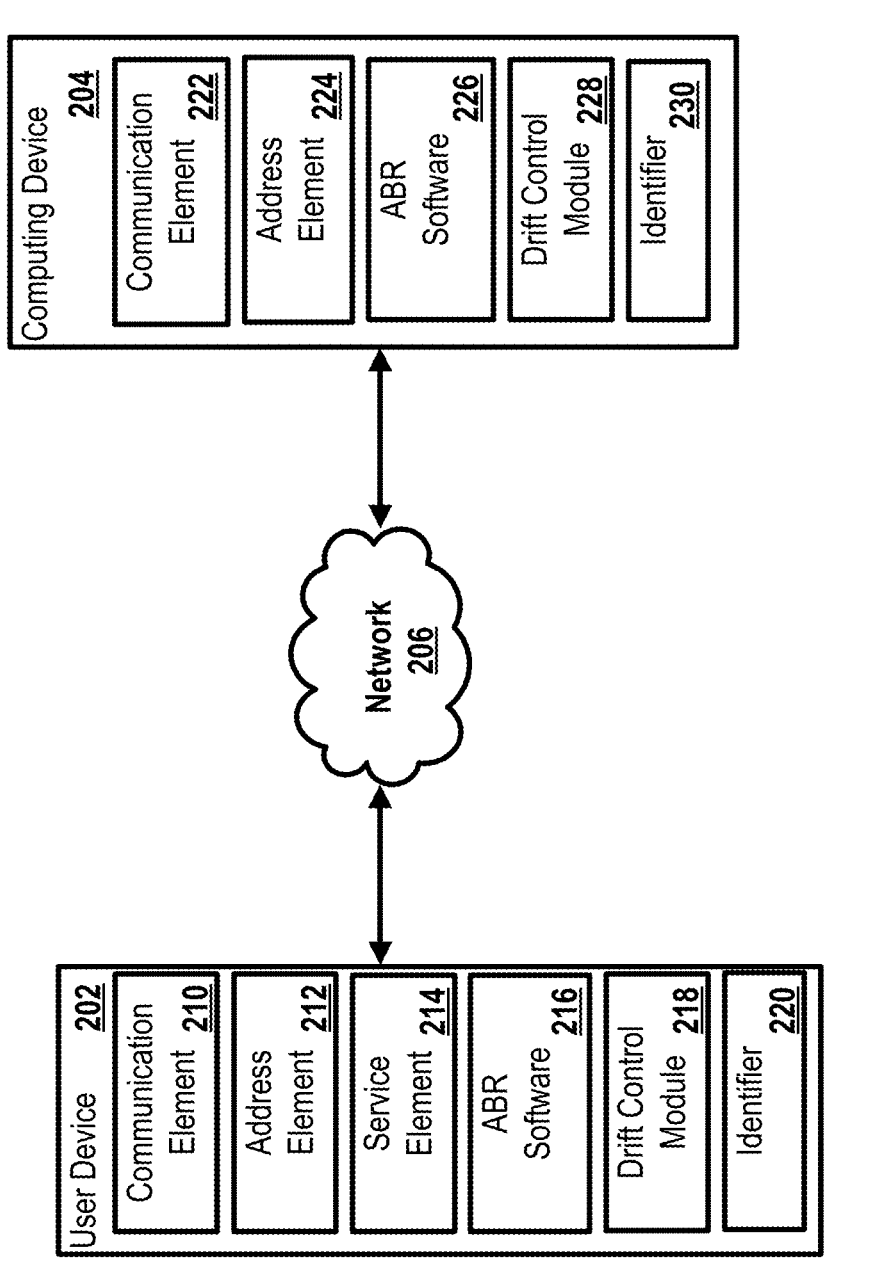
FIG. 2A shows an example system for low latency streaming.

FIG. 2A shows a system 200 for low latency streaming. The system 200 may include a user device 202 and a computing device 204. The user device 202 may communicate with the computing device 204 via a network 206 (e.g., the network 116 of FIG. 1). The network 206 may support communication between the user device 202 and the computing device 204 via a short-range communications (e.g., BLUETOOTH®, near-field communication, infrared, etc.) and/or via a long-range communications (e.g., Internet, cellular, satellite, and the like).

The user device 202 (e.g., the media device 120, the communication terminal 122, and/or the mobile device 124 of FIG. 1) may include a communication element 210, an address element 212, a service element 214, Adaptive Bitrate (ABR) software 216, drift control module 218, and an identifier 220.

The communication element 210 may be capable of communicating via any network protocol. For example, the communication element 210 may communicate via wired network protocol (e.g., Ethernet, LAN, etc.). The communication element 210 may have a wireless transceiver configured to send and receive wireless communications via a wireless network (e.g., the network 206). The wireless network may be a Wi-Fi network. The user device 202 may communicate with the computing device 204 via the communication element 210. The communication element 210 may be a network interface card. The communication element 210 may receive chunks of data, packets of data, Ethernet frames, IP packets, access units, and so forth.

The user device 202 may include an address element 212 and a service element 214. The address element 212 may comprise or provide an internet protocol address, a network address, a media access control (MAC) address, an Internet address, or the like. The address element 212 may be used to establish a communication session between the user device 202, the computing device 204, and/or other devices and/or networks. The address element 212 may be an identifier or locator of the user device 202. The address element 212 may be persistent for a particular network (e.g., the network 206).

The service element 214 may comprise an identification of a service provider associated with the user device 202 and/or with the class of user device 202. The class of the user device 202 may be related to a type of device, capability of device, type of service being provided, and/or a level of service (e.g., business class, service tier, service package, etc.). The service element 214 may comprise information relating to or provided by a service provider (e.g., Internet service provider, content service provider, etc.) that provides or enables data flow such as communication services and/or content services to the user device 202. The service element 214 may comprise information relating to a preferred service provider for one or more particular services relating to the user device 202. The address element 212 may be used to identify or retrieve data from the service element 214, or vice versa. One or more of the address element 212 and/or the service element 214 may be stored remotely from the user device 202. Other information may be represented by the service element 214.

The user device 202 may be associated with a user identifier or device identifier 220. The device identifier 220 may be any identifier, token, character, string, or the like, for differentiating one user or user device (e.g., the user device 202) from another user or user device. For example, the device identifier 220 may be or relate to an Internet Protocol (IP) Address IPV4/IPV6, a media access control address (MAC address), an International Mobile Equipment Identity (IMEI) number, an International Mobile Subscriber Identity (IMSI) number, a phone number, a SIM card number, and/or the like. The device identifier 220 may identify a user or user device as belonging to a particular class of users or user devices. The device identifier 220 may comprise information relating to the user device 202 such as a manufacturer, a model or type of device, a service provider associated with the user device 202, a state of the user device 202, a locator, and/or a label or classifier. Other information may be represented by the device identifier 220.

Figure 2B:
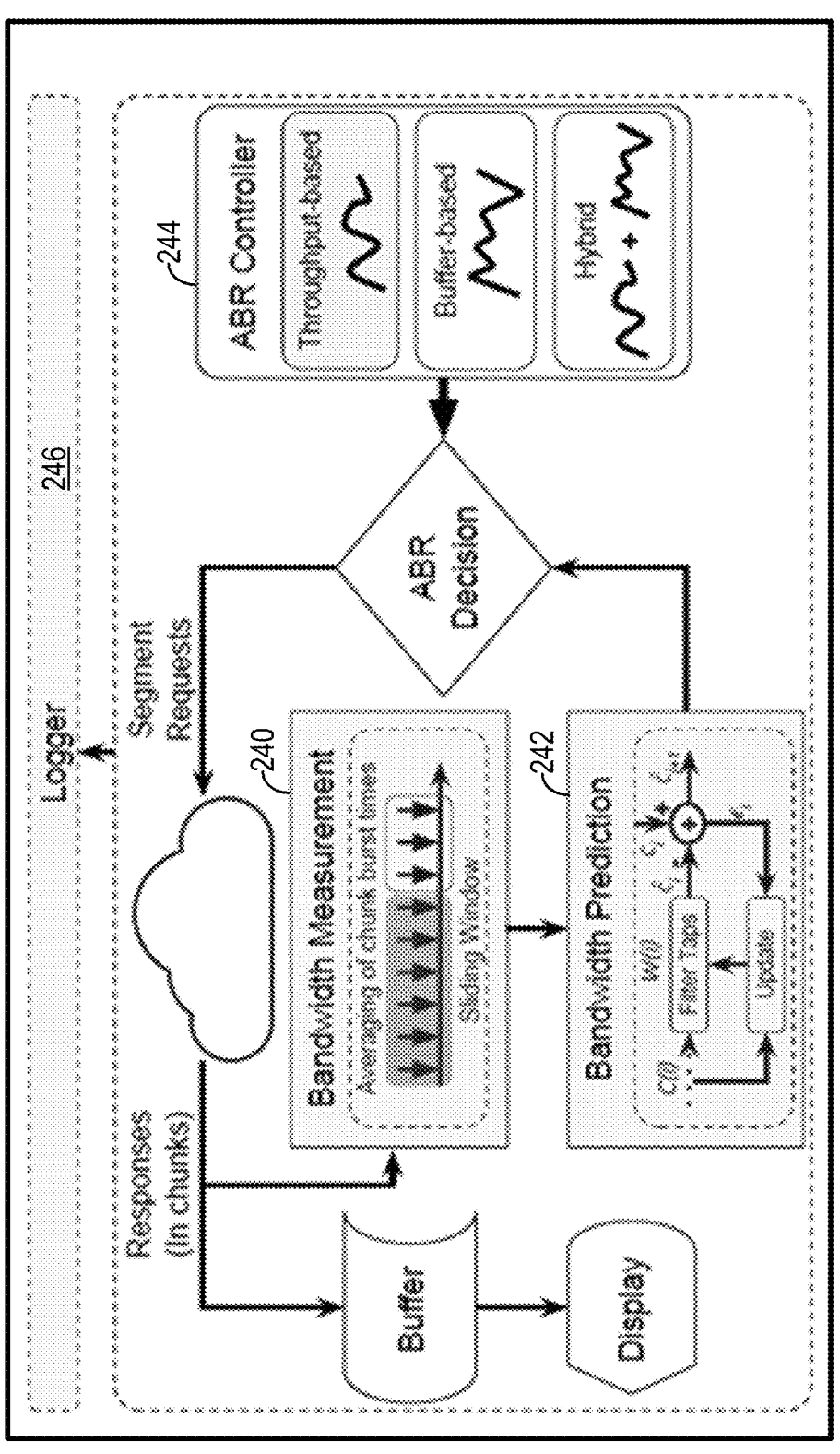
FIG. 2B shows an example application configuration for low latency streaming.

The user device 202 may include ABR software 216. FIG. 2B is a block diagram of the ABR software 216. The ABR software 216 may include at least four components, a bandwidth measurement module 240, a bandwidth prediction module 242, an ABR controller 244, and a logger module 246. Table 1 includes a list of notations for equations used by the ABR software 216.

TABLE 1

| M | Filter length |
|---|---|
| W(i) | Filter Taps (coefficients) vector of length M |
| P(i) | The inverse correlation matrix of size M × M |
| $\mathcal{G}$ (i) | The gain vector of length M |
| C(i) | Most recent bandwidth measurements of length M |
| R | List of bitrate levels |
| σ | Initial input variance estimate parameter for P(0) |
| λ | Forgetting factor |
| i | Chunk downloading step |
| $c_i$ | Measured average bandwidth at step i |
| $\epsilon_i$ | Estimated error at step i |
| $y_i (= \hat{c}_i)$ | The bandwidth prediction at step i |
| $\hat{c}_{i+1}$ | Bandwidth prediction at next step (step i + 1) |
| $r_i$ | Bitrate level selected at step i |
| $l_i$ | Current latency at step i |
| $l_{target}$ | Target latency |
| $B_i$ | Buffer level at step i |
| z | Sliding window for bandwidth measurements |
| K | Total number of downloaded chunks |
| $Q_m^n$ | Size of $m^{th}$ segment's $n^{th}$ chunk |
| $b_m^n$ | Beginning time of chunk download |
| $e_m^n$ | End time of chunk download |

Figure 2C:
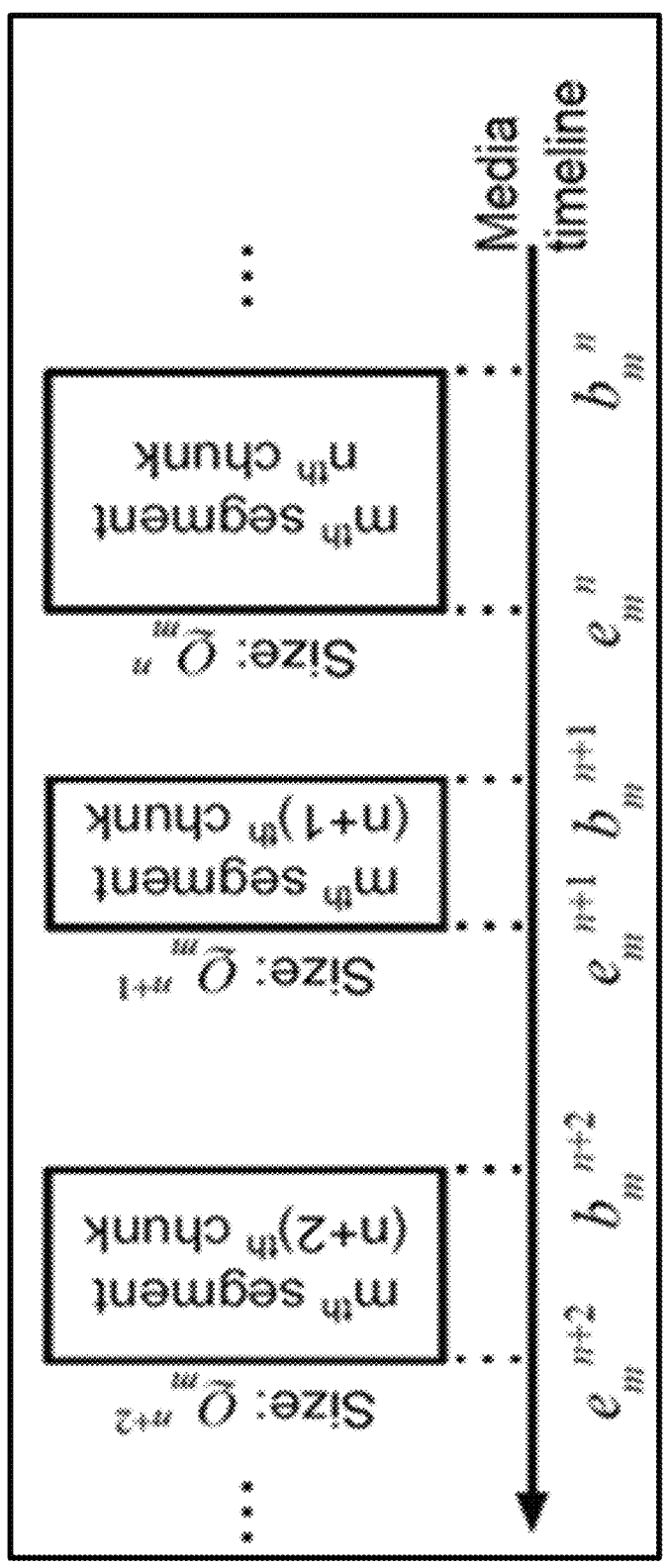
FIG. 2C shows example bandwidth determination for low latency streaming.

The bandwidth measurement module 240 may utilize a sliding window moving average bandwidth measurement method, which computes the average bandwidth for the last z successful chunk downloads. For example, z may be any number of successful chunk downloads (e.g., 1, 2, 3, 5, 10, etc.). At each chunk downloading step i, the average bandwidth is determined by the bandwidth measurement module 240 as follows:

$$c_i = \frac{1}{z} \sum_{n=0}^{z-1} \frac{Q_m^{i-n}}{e_m^{i-n} - b_m^{i-n}}$$

where Q is the chunk size, and b and e are the beginning and end times of the chunk download, respectively. FIG. 2C provides an example illustration of the average bandwidth determination by the bandwidth measurement module 240. The bandwidth measurement module 240 may determine Q from the chunk of the content (e.g., the HTTP header). The bandwidth measurement module 240 may determine the value for e (e.g., the end time of a chunk download). For example, the bandwidth measurement module 240 may utilize the HTTP Fetch API to provide the value for e. If there is a non-negligible idle period after a chunk is downloaded (e.g., when $bnm+1-e_m^n$, >>0), the bandwidth measurement module 240 may disregard the chunk when determining the bandwidth.

For each chunk n (for segment m), the bandwidth measurement module 240 may divide the size of the partial buffer ($Q_m^n$) by the delta time between the previous chunk's end time ($e^{n-1}$ m) and the current chunk's end time ($e_m^n$). If this download rate is close to the average download rate of the segment ($Sm/\tau*m$), it implies there is non-negligible idle period from $e_m^{n-1}$ to $e_m^n$, and this chunk may be disregarded by the bandwidth measurement module 240 in determining the bandwidth. If not, the idle period is negligible and the chunk download rate is a good approximation of the available bandwidth. The bandwidth measurement module 240 may utilize the chunk in determining the bandwidth.

The bandwidth prediction module 242 may utilize a linear history-based prediction, in particular, an online linear adaptive filter that is based on a recursive least squares (RLS) approach to predict bandwidth. The procedure for predicting bandwidth is presented in the following steps (1-13) of the Algorithm 1.

| | Algorithm 1 |
|---|---|
| 1. | W(0) = 0, P(0) = I × σ⁻¹, ∈ = 0, C(0) = 0 |
| 2. | σ = 0.001, λ = 0.999, BW-Measurement = Sliding-Window( ) |
| 3. | function ABRUpdate ( ) |
| 4. | for Each chunk downloading step I > 0 do |
| 5. | $\mathcal{G}(i) = \dfrac{\lambda^{-1} P(i-1)C(i-1)}{1 + C^T(i-1)P(i-1)C(i-1)}$ |
| 6. | P(i) = λ⁻¹ P (i − 1) − λ⁻¹ $\mathcal{G}$(i)$C^T$ (i − 1)P(i − 1) |
| 7. | $c_i$ = Sliding-Window ( ) |
| 8. | $y_i = \hat{c}_i = W^T$ (i − 1)C(i − 1) |
| 9. | $\epsilon_i = c_i - y_i$ |
| 10. | C(i) = Update($c_i$) |
| 11. | W(i) = W(i − 1) + $\epsilon_i$ $\mathcal{G}$ (i) |
| 12. | $\hat{c}_{i-1}$ = W(i)C(i) |
| 13. | Return($\hat{c}_{i-1}$) | where for each chunk downloading step i, the bandwidth prediction module 242 may take as an input a vector of the M most recent bandwidth measurement values C(i) given by the bandwidth measurement component (BW-Measurement), and then recursively computes the gain vector G(i), the inverse correlation matrix P(i) of the bandwidth measurement values, and the estimated error ∈i. These values are then used to update the filter taps vector W (i) of length M, and finally return the future bandwidth prediction for the next step c^i+1 (=W(i) C(i)). RLS may be used for three main reasons. For accurate bandwidth prediction, the bandwidth prediction module 242 attempts to minimize the error (min ∈i) between the next (step i+1) bandwidth measurement and the current (step i) future bandwidth prediction.

The ABR controller 244 may utilize one or more adaptive bitrate (ABR) schemes. For example, the ABR controller 244 may utilize a throughput based ABR scheme utilizing the measured bandwidth to perform the ABR decisions, a buffer based (BOLA) scheme utilizing the playback buffer occupancy to perform the ABR decisions, and/or a hybrid scheme which may be a combination of throughput-based and buffer-based. The ABR controller 244 may also monitor the playback buffer occupancy to avoid stalls and maintain the buffer occupancy within a safe region (between minimum and maximum predefined thresholds for CMAF low latency). For example, the ABR controller 244 may utilize the throughput-based ABR scheme, which is in turn based on the bandwidth measurement module 240 and the bandwidth prediction module 242. At every chunk downloading step i, the ABR controller 244 takes the bandwidth prediction value c^i+1 as input and then outputs the optimal bitrate level. The objective function F is defined as:

$$F \begin{cases} \text{find } r_i^*, \text{ argmin } \epsilon_i \text{ and argmax } QoE_i \; \forall \, i > 0, \\ \text{s.t. } l_i \le l_{target}, \\ c_i \approx y_i, \text{ and } r_i^* \approx \hat{c}_{i+1} \\ 0.5 \le B_i \le l_{target} \end{cases}$$

where the objective is to find the optimal bitrate level $r_i^* \in R$ that minimizes the estimated error and maximizes the QoE respecting a target latency (e.g., 1, 2, 3, 4, seconds), keeping the current latency li sufficiently small, current network capacity, and current playback buffer occupancy Bi.

The user device 202 may include a drift control module 218. The user device 202 may receive content. The content may be one or more chunks, packets, frames, access units, and so forth. The content may be video content. The content may be a live event. The chunk of content may have metadata. The metadata may indicate one or more characteristics of the chunk of content. The user device 202 may request the chunk of the content. For example, the user device 202 may send a request to a source of the content (e.g., an encoder) indicating one or more characteristics of the requested content. For example, the user device 202 may indicate a bitrate of the chunk of the content that the computing device desires. The user device 202 may utilize an adaptive bitrate (ABR) protocol when requesting the content. The content may be delayed before being sent to the computing device in order to artificially prevent the content from being source limited. That is, by delaying the content (e.g., live content) before it is sent, the source of the content has an opportunity to not be the bottleneck in the network. Additionally, the chunk size will change based on this delay which will facilitate determining whether future chunks are source limited or bandwidth limited.

The drift control module 218 may determine a clock reference based on the chunk of the content. For example, the drift control module 218 may determine the clock reference from the metadata of the chunk of the content. The drift control module 218 may determine one or more media time stamps based on the chunk of the content. For example, the metadata of the chunk of the content may have the one or more media time stamps. The drift control module 218 may determine a wall clock time (e.g., a time that is local, relative, and/or specific to the user device 202 determined from an internal clock of the user device 202, etc.). The drift control module 218 may determine the wall clock time based on a clock time associated with the user device 202. For example, the user device 202 may have a clock associated with the user device 202. The drift control module 218 may determine the wall clock time from the clock associated with the user device 202.

The drift control module 218 may determine a modified wall clock time. The modified wall clock time may be a time that is synchronized with a source of the chunk of content (e.g., the computing device 204). The modified wall clock time may be determined based on the metadata of the chunk of the content. For example, the metadata of the chunk of the content may indicate a time that the source of the chunk of content encoded the chunk. The drift control module 218 may determine, based on a duration of the chunk of the content, how much the wall clock needs to be modified to accurately reflect the time of the source of the content. Thus, the drift control module 218 synchronizes the wall clock of the user device 202 with a wall clock of the source of the content (e.g., the computing device 204).

For example, the computing device 204 may encode the content with a time stamp that indicates the time that the content was encoded. The user device 202 may receive two chunks of content that each indicate a respective time that the computing device 204 encoded the two chunks of content. The two chunks of content may be adjacent to each other in time. That is, the two chunks of content may be received one after the other. The user device 202 may determine the arrival time of each of the chunks of the content. The user device 202 may utilize the arrival time of each of the chunks of the content, as well as the time that the source device encoded the content, to determine a difference between the wall clock of the user device 202 and the clock of the computing device 204. The drift control module may modify the wall clock of the user device 202 based on this difference so that the wall clock of the user device 202 is synchronized with the computing device 204.

For example, the user device 202 may determine a modified wall clock time that is not synchronized with the computing device 204. For example, referring to the example above, the user device 202 may determine the difference between the time that the chunks arrive and the time that the source device encoded the chunks. For example, the arrival time of the first chunk and the time that the first chunk was encoded by the computing device 204 may have a difference of 50 ms. Similarly, the second chunk of content may have a difference of 50 ms between the time that the computing device 204 encoded the chunk and the arrival time. The user device 202 may utilize this difference to shift the clock of the user device 202 such that the arrival time of the chunk matches the time that the computing device 204 encoded the content. For example, the user device 202 may add 50 ms to the wall clock of the user device 202 such that the arrival time of the first and second chunk of content are the same as the time that the computing device 204 encoded the content. The wall clock of the user device 202 may not be actually synchronized with the clock of the computing device 204 (source of the content). Rather, the wall clock of the user device 202 is modified (e.g., adjusted and/or shifted) to match the time the computing device 204 encoded the content. The wall clock of the user device 202 is modified so that the arrival time of the chunks of content will match the time that the computing device 204 encoded the chunks of content, even though the time that the chunks of content arrive at the user device 202 is a different time at the computing device 204. For example, a third chunk of content may arrive at 100 ms, which matches the time the computing device 204 encoded the chunk of content. However, the time at the computing device 204 when the third chunk of content actually arrives at the user device 202 may be higher/greater than 100 ms because time has passed between the time that the computing device 204 encoded the chunk of content and sent the chunk of content to the user device 202.

The drift control module 218 may determine a transmission duration of the chunk of the content based on the modified wall clock. For example, the drift control module 218 may utilize the modified wall clock (e.g., the synchronized wall clock) to determine the transmission duration of the chunk of the content in the modified wall clock time. That is, the drift control module 218 may determine the transmission duration of the chunk of the content relative to the time that the computing device 204 sent the chunk of the content.

The drift control module 218 may determine whether the transmission duration of the chunk of the content satisfies a threshold. For example, the drift control module 218 may compare the transmission duration of the chunk of the content to a media time of the chunk of content. The media time of the chunk of content may be the time that the content is displayed and/or encoded out. For example, the drift control module 218 may utilize the one or more media time stamps to determine a media time duration of the chunk of the content. Thus, by utilizing the modified wall clock, which is synchronized to the computing device 204, the drift control module 218 may determine if a latency of the chunk of the content was limited by the bandwidth of a network that sent the chunk of content or if the latency of the chunk of the content was limited by the computing device 204.

For example, if the transmission duration and a duration of the media time of the chunk of content are inside a threshold (e.g., do not satisfy the threshold) which indicates they are approximately the same, that indicates that the chunk of content was limited by the computing device 204 (e.g., source of content, etc.) because the chunk of content took as long to download the chunk of content as it took the computing device 204 to encode and transmit the chunk of content. Alternatively, if the transmission duration and the duration of the media time of the chunk of content are outside a threshold (e.g., satisfy a threshold), that indicates that the latency of the chunk of the content was limited by the bandwidth of the network because it took the computing device longer to download the chunk of content than it took the computing device 204 to encode and send the content. Accordingly, the drift control module 218 may determine whether the chunk of the content is network limited or source limited.

The drift control module 218 may determine a bitrate for a next chunk of the content may be based on the chunk of the content satisfying the threshold. For example, the drift control module 218 may determine based on whether the chunk of the content is network limited or source limited to utilize the chunk of the content in determining a bitrate. For example, if the chunk of content is network limited, the transmission duration of the chunk of content may be utilized, along with the size of the chunk of the content, to determine the bandwidth of the network. The drift control module 218 may determine a bitrate based on the bandwidth of the network. The drift control module 218 may only use chunks of content that are network limited to determine bandwidth of the network. For example, the chunks of content that are source limited do not accurately reflect the bandwidth of the network because the source (e.g., the computing device 204, etc.) is the cause of the bottleneck. Accordingly, the drift control module 218 may ignore (e.g., discard) chunks of content that are source limited when determining the bitrate for the next chunk of the content.

The drift control module 218 may receive a plurality of Ethernet frames. For example, the content may be received as a plurality of Ethernet frames. The first Ethernet frame may be received by a network interface card (e.g., the communication element 210) of the user device 202. The first Ethernet frame may be the first frame of the chunk of content. The drift control module 218 may determine an arrival time of the first Ethernet frame. For example, the user device 202 may time stamp when the first Ethernet frame is received by the user device 202. For example, the network interface card may time stamp each Ethernet frame that is received. A second Ethernet frame having a second portion of the chunk of the content may be received by the user device 202. The second Ethernet frame may be the end of the chunk of the content. The drift control module 218 may determine an arrival time of the second Ethernet frame. While Ethernet frames are used for ease of explanation, a person skilled in the art would appreciate that any data structure may be used. For example, IP packets may be used.

The drift control module 218 may determine a modified wall clock time. The modified wall clock time may be a time that is synchronized with a source of the chunk of content. The modified wall clock time may be determined based on the metadata of the chunk of the content. For example, the metadata of the chunk of the content may indicate a time that the computing device 204 (the source of the content) encoded the chunk. The drift control module 218 may determine, based on the duration of transmission of the chunk of the content, how the wall clock needs to be modified to accurately reflect the time of the computing device 204 (the source of the content). The drift control module 218 may synchronize the wall clock of the user device 202 with a wall clock of the computing device 204.

For example, the computing device 204 may encode the content with a time stamp that indicates the time that the content was encoded. The user device 202 may receive two Ethernet frames that each indicate a respective time that the source device encoded the two Ethernet frames. The two Ethernet frames may be adjacent to each other in time. That is, the two Ethernet frames may be received one after the other. The user device 202 may determine the arrival time of each of the Ethernet frames. The user device 202 may utilize the arrival time of each of the Ethernet frames, as well as the time that the computing device 204 encoded the content, to determine a difference between the wall clock of the user device 202 and the clock of the computing device 204. The drift control module may modify the wall clock of the user device 202 based on this difference so that the wall clock of the user device 202 is synchronized with the computing device 204.

For example, the user device 202 may determine a modified wall clock time that is not synchronized with the computing device 204. For example, referring to the example above, the user device 202 may determine the difference between the time that the Ethernet frames arrive and the time that the computing device 204 encoded the Ethernet frames. For example, the arrival time of the first Ethernet frame and the time that the first Ethernet frame was encoded by the computing device 204 may have a difference of 50 ms. Similarly, the second Ethernet frame may have a difference of 50 ms between the time that the computing device 204 encoded the Ethernet frame and the arrival time. The user device 202 may utilize this difference to shift the clock of the user device 202 such that the arrival time of the Ethernet frames matches the time that the computing device 204 encoded the Ethernet frames. The user device 202 may add 50 ms to the wall clock of the user device 202 such that the arrival time of the first and second Ethernet frames are the same as the time that the source device encoded the Ethernet frames. The wall clock of the user device 202 may not actually be synchronized with the clock of the computing device 204 (e.g., the source of the content, etc.). Rather, the wall clock of the user device 202 may be modified (e.g., adjusted and/or shifted) to match the time the computing device 204 (e.g., the source of the content, etc.). That is, the wall clock of the user device 202 may be modified so that the arrival time of the Ethernet frames will match the time that the computing device 204 encoded the Ethernet frames, even though the time that the Ethernet frames arrive at the computing device is a different time at the computing device 204 (e.g., the source of the content, etc.). For example, a third Ethernet frame may arrive at 100 ms, which matches the time the computing device 204 encoded the Ethernet frame. However, the time at the computing device 204 when the third frame actually arrives at the user device 202 is actually higher than 100 ms because time has passed between the time that the computing device 204 encoded the Ethernet frame and sent the Ethernet frame to the user device 202.

The drift control module 218 may determine a transmission duration of the chunk of the content is determined based on the arrival time of the first Ethernet frame and the arrival time of the second Ethernet frame. For example, the first Ethernet frame may be the first frame of a plurality of frames of the chunk of content, and the second Ethernet frame may be the last frame of the plurality of frames of the chunk of content. Thus, the drift control module 218 may determine a transmission duration of the chunk of content based on the time that the first and last Ethernet frame were received.

The drift control module 218 may receive a complete access unit of content. The complete access unit of content may have metadata. The metadata may indicate one or more characteristics of the complete access unit of content. The user device 202 may request the complete access unit of the content. For example, the user device 202 may send a request to a source of the content (e.g., the computing device 204, an encoder, etc.) indicating one or more characteristics of the requested content. For example, the user device 202 may indicate a bitrate of the complete access unit of the content that the user device 202 desires. The computing device may utilize an adaptive bitrate (ABR) protocol when requesting the content.

The drift control module 218 may determine a clock reference based on the complete access unit of the content. For example, the drift control module 218 may determine the clock reference from the metadata of the complete access unit of the content. The drift control module 218 may determine one or more media time stamps based on the complete access unit of the content. For example, the metadata of the complete access unit of the content may have the one or more media time stamps.

The drift control module 218 may determine a modified wall clock time based on the metadata of the complete access unit of the content. For example, the metadata of the complete access unit of the content may indicate a time that the source of the complete access unit of content (e.g., the computing device 204, an encoder, etc.) encoded the complete access unit. The drift control module 218 may determine, based on a duration of the complete access unit of the content, how much the wall clock needs to be modified to accurately reflect the time of the source of the content. Thus, the drift control module 218 synchronizes the wall clock of the user device 202 with a wall clock of a source (e.g., the computing device 204, an encoder, etc.) of the content.

For example, the computing device 204 may encode the content with a time stamp that indicates the time that the content was encoded. The user device 202 may receive two complete access units of content that each indicate a respective time that the computing device 204 encoded the two complete access units of content. The two complete access units of content may be adjacent to each other in time. That is, the two complete access units of content may be received one after the other. The user device 202 may determine the arrival time of each of the complete access units of the content. The user device 202 may utilize the arrival time of each of the complete access units of the content, as well as the time that the computing device 204 encoded the content, to determine a difference between the wall clock of the user device 202 and the clock of the computing device 204. The drift control module may modify the wall clock of the user device 202 based on this difference so that the wall clock of the user device 202 is synchronized with the computing device 204.

For example, the user device 202 may determine a modified wall clock time that is not synchronized with the computing device 204. For example, referring to the example above, the user device 202 may determine the difference between the time that the complete access units arrive and the time that the computing device 204 encoded the complete access units. For example, the arrival time of the first complete access unit and the time that the first complete access unit was encoded by the source may have a difference of 50 ms. Similarly, the second complete access unit of content may have a difference of 50 ms between the time that the source encoded the chunk and the arrival time. The user device 202 may utilize this difference to shift the clock of the user device 202 such that the arrival time of the complete access units matches the time that the source device encoded the content. The user device 202 may, for example, add 50 ms to the wall clock of the user device 202 such that the arrival time of the first and second complete access units of content are the same as the time that the source device encoded the content. Thus, the wall clock of the user device 202 may not actually be synchronized with the clock of the source of the content (e.g., the computing device 204, an encoder, etc.). Rather, the wall clock of the user device 202 may be modified (e.g., adjusted and/or shifted) to match the time the computing device 204 encoded the content. The wall clock of the user device 202 is modified so that the arrival time of the complete access units of content will match the time that the computing device 204 encoded the chunks of content, even though the time that the chunks of content arrive at the user device 202 is a different time at the computing device 204. For example, a third complete access unit of content may arrive at 100 ms, which matches the time the computing device 204 encoded the complete access unit. However, the time at the computing device 204 when the third complete access unit of content actually arrives at the user device 202 may actually be higher/greater than 100 ms because time has passed between the time that the computing device 204 encoded the complete access unit of content and sent the complete access unit of content to the user device 202.

The drift control module 218 may determine a transmission duration of the complete access unit of the content based on the modified wall clock. For example, the drift control module 218 may utilize the modified wall clock (e.g., the synchronized wall clock) to determine the transmission duration of the complete access unit of the content in the modified wall clock time. That is, the drift control module 218 may determine the transmission duration of the complete access unit of the content relative to the time that the computing device 204 and/or an encoder sent the complete access unit of the content.

The drift control module 218 may determine whether the transmission duration of the complete access unit of the content satisfies a threshold. For example, drift control module 218 may compare the transmission duration of the complete access unit of the content to a media time of the complete access unit of content. The media time of the complete access unit of content may be the time that the content is displayed and/or encoded out. For example, the drift control module 218 may utilize the one or more media time stamps to determine a media time duration of the complete access unit of the content. Thus, by utilizing the modified wall clock, which is synchronized to the source of the content (e.g., computing device 204, and encoder, etc.), the drift control module 218 may determine if a latency of the complete access unit of the content was limited by the bandwidth of a network that sent the complete access unit of content or if the latency of the complete access unit of the content was limited by the source of the content.

For example, if the transmission duration and a duration of the media time of the complete access unit of content are inside a threshold (e.g., do not satisfy the threshold) approximately the same, that indicates that the complete access unit of content was limited by the source of content because the complete access unit of content took as long to download the complete access unit of content as it took the source of the content to encode and transmit the complete access unit of content. Alternatively, if the transmission duration and the duration of the media time of the complete access unit of content are outside a threshold (e.g., satisfy a threshold), that indicates that the latency of the complete access unit of the content was limited by the bandwidth of the network because it took the user device 202 longer to download the complete access unit of content than it took the source to encode and send the content. Accordingly, the drift control module 218 may determine whether the complete access unit of the content is network limited or source limited.

The drift control module 218 may determine a bitrate for a next complete access unit of the content based on the complete access unit of the content satisfying the threshold. For example, the drift control module 218 may determine based on whether the complete access unit of the content is network limited or source limited to utilize the complete access unit of the content in determining a bitrate. For example, if the complete access unit of content is network limited, the transmission duration of the complete access unit of content may be utilized, along with the size of the complete access unit of the content, to determine the bandwidth of the network. The drift control module 218 may determine a bitrate based on the bandwidth of the network. The drift control module 218 may only use complete access units of content that are network limited to determine bandwidth of the network. For example, the complete access units of content that are source limited do not accurately reflect the bandwidth of the network because the source is the cause of the bottleneck. Accordingly, the drift control module 218 may ignore (e.g., discard) complete access units of content that are source limited when determining the bitrate for the next complete access unit of the content.

The computing device 204 (e.g., the server 110, the application server 126, the content source 127, and/or the edge device 128 of FIG. 1) may include a communication element 22, an address element 224, Adaptive Bitrate (ABR) software 226, drift control module 228, and an identifier 230.

The communication element 222 may be capable of communicating via any network protocol. For example, the communication element 222 may communicate via wired network protocol (e.g., Ethernet, LAN, etc.). The communication element 222 may have a wireless transceiver configured to send and receive wireless communications via a wireless network (e.g., the network 206). The wireless network may be a Wi-Fi network. The computing device 204 may communicate with the user device 202 via the communication element 222. The communication element 222 may be a network interface card. The communication element 222 may receive chunks of data, packets of data, Ethernet frames, access units, and so forth.

The computing device 204 may include an address element 224. The address element 224 may comprise or provide an internet protocol address, a network address, a media access control (MAC) address, an Internet address, or the like. The address element 224 may be used to establish a communication session between the computing device 204, the user device 202, and/or other devices and/or networks. The address element 224 may be an identifier or locator of the computing device 204. The address element 224 may be persistent for a particular network (e.g., the network 206).

The computing device 204 may be associated with a user identifier or device identifier 230. The device identifier 230 may be any identifier, token, character, string, or the like, for differentiating one user or computing device (e.g., the computing device 204) from another user or computing device. For example, the device identifier 230 may be or relate to an Internet Protocol (IP) Address IPV4/IPV6, a media access control address (MAC address), an International Mobile Equipment Identity (IMEI) number, an International Mobile Subscriber Identity (IMSI) number, a phone number, a SIM card number, and/or the like. The device identifier 230 may identify a user or computing device 204 as belonging to a particular class of users or computing devices. The device identifier 230 may comprise information relating to the computing device 204 such as a manufacturer, a model or type of device, a service provider associated with the computing device 204, a state of the computing device 204, a locator, and/or a label or classifier. Other information may be represented by the device identifier 230.

The computing device 204 may include ABR software 226. The ABR software 226 may be configured in the same manner as the ABR software 216. For example, the ABR software 226 may include the bandwidth measurement module 240, the bandwidth prediction module 242, the ABR controller 244, and the logger module 246.

As previously described, the bandwidth measurement module 240 may utilize a sliding window moving average bandwidth measurement method, which computes the average bandwidth for the last z successful chunk downloads. For example, z may be any number of successful chunk downloads (e.g., 1, 2, 3, 5, 10, etc.). At each chunk downloading step i, the average bandwidth is determined by the bandwidth measurement module 240 as follows:

$$c_i = \frac{1}{z} \sum_{n=0}^{z-1} \frac{Q_m^{i-n}}{e_m^{i-n} - b_m^{i-n}}$$

where Q is the chunk size, and b and e are the beginning and end times of the chunk download, respectively. FIG. 2C provides an example illustration of the average bandwidth determination by the bandwidth measurement module 240. The bandwidth measurement module 240 may determine Q from the chunk of the content (e.g., the HTTP header). The bandwidth measurement module 240 may determine the value for e (e.g., the end time of a chunk download). For example, the bandwidth measurement module 240 may utilize the HTTP Fetch API to provide the value for e. If there is a non-negligible idle period after a chunk is downloaded (e.g., when $bnm+1-e_m^n >> 0$), the bandwidth measurement module 240 may disregard the chunk when determining the bandwidth.

For each chunk n (for segment m), the bandwidth measurement module 240 may divide the size of the partial buffer $(Q_m^n)$ by the delta time between the previous chunk's end time $(e^{n-1}m)$ and the current chunk's end time $(e_m^n)$. If this download rate is close to the average download rate of the segment (Sm/τ*m), it implies there is non-negligible idle period from $e_{m-1}^n$ to $e_m^n$, and this chunk may be disregarded by the bandwidth measurement module 240 in determining the bandwidth. If not, the idle period is negligible and the chunk download rate is a good approximation of the available bandwidth. The bandwidth measurement module 240 may utilize the chunk in determining the bandwidth.

The bandwidth prediction module 242 may utilize a linear history-based prediction, in particular, an online linear adaptive filter that is based on a recursive least squares (RLS) approach to predict bandwidth. As described, the procedure for predicting bandwidth is presented in the steps (1-13) of the Algorithm 1.

For each chunk downloading step i, the bandwidth prediction module 242 may take as an input a vector of the M most recent bandwidth measurement values C(i) given by the bandwidth measurement component (BW-Measurement), and then recursively computes the gain vector G(i), the inverse correlation matrix P(i) of the bandwidth measurement values, and the estimated error $\epsilon i$. These values are then used to update the filter taps vector W (i) of length M, and finally return the future bandwidth prediction for the next step $c\hat{}i+1$ (=W(i) C(i)). RLS may be used for three main reasons. For accurate bandwidth prediction, the bandwidth prediction module 242 attempts to minimize the error (min $\epsilon i$) between the next (step i+1) bandwidth measurement and the current (step i) future bandwidth prediction.

The ABR controller 244 may utilize one or more adaptive bitrate (ABR) schemes. For example, the ABR controller 244 may utilize a throughput based ABR scheme utilizing the measured bandwidth to perform the ABR decisions, a buffer based (BOLA) scheme utilizing the playback buffer occupancy to perform the ABR decisions, and/or a hybrid scheme which may be a combination of throughput-based and buffer-based. The ABR controller 244 may also monitor the playback buffer occupancy to avoid stalls and maintain the buffer occupancy within a safe region (between minimum and maximum predefined thresholds for CMAF low latency). For example, the ABR controller 244 may utilize the throughput-based ABR scheme, which is in turn based on the bandwidth measurement module 240 and the bandwidth prediction module 242. At every chunk downloading step i, the ABR controller 244 takes the bandwidth prediction value $c\hat{}i+1$ as input and then outputs the optimal bitrate level. The objective function F is defined as:

$$F \begin{cases} \text{find } r_i^*, \text{argmin } \epsilon_i \text{ and argmax } QoE_i \ \forall \ i > 0, \\ \text{s.t. } l_i \le l_{target}, \\ c_i \approx y_i, \text{ and } r_i^* \approx \hat{c}_{i+1} \\ 0.5 \le B_i \le l_{target} \end{cases}$$

The computing device 204 may include a drift control module 228. The computing device 204 may receive content. The content may be one or more chunks, packets, frames, access units, and so forth. The content may be video content. The content may be a live event. The chunk of content may have metadata. The metadata may indicate one or more characteristics of the chunk of content. The computing device 204 may request the chunk of the content. For example, the computing device 204 may send a request to a source of the content (e.g., an encoder) indicating one or more characteristics of the requested content. For example, the computing device 204 may indicate a bitrate of the chunk of the content that the computing device 204 desires. The computing device 204 may utilize an adaptive bitrate (ABR) protocol when requesting the content. The content may be delayed before being sent to the computing device 204 in order to artificially prevent the content from being source limited. That is, by delaying the content (e.g., live content) before it is sent, the source of the content has an opportunity to not be the bottleneck in the network. Additionally, the chunk size will change based on this delay which will facilitate determining whether future chunks are source limited or bandwidth limited.

The drift control module 228 may determine a clock reference based on the chunk of the content. For example, the drift control module 228 may determine the clock reference from the metadata of the chunk of the content. The drift control module 228 may determine one or more media time stamps based on the chunk of the content. For example, the metadata of the chunk of the content may have the one or more media time stamps. The drift control module 228 may determine a wall clock time. The drift control module 228 may determine the wall clock time based on a clock time associated with the computing device 204. For example, the computing device 204 may have a clock associated with the computing device 204. The drift control module 228 may determine the wall clock time from the clock associated with the computing device 204.

The drift control module 228 may determine a modified wall clock time. The modified wall clock time may be a time that is synchronized with a source of the chunk of content. The modified wall clock time may be determined based on the metadata of the chunk of the content. For example, metadata of the chunk of the content may indicate a time that the source of the chunk of content encoded the chunk. The drift control module 228 may determine, based on a duration of the chunk of the content, how much the wall clock needs to be modified to accurately reflect the time of the source of the content. Thus, the drift control module 228 synchronizes the wall clock of the computing device 204 with a wall clock of the source of the content.

For example, the source device may encode the content with a time stamp that indicates the time that the content was encoded. The computing device 204 may receive two chunks of content that each indicate a respective time that the source device encoded the two chunks of content. The two chunks of content may be adjacent to each other in time. That is, the two chunks of content may be received one after the other. The computing device 204 may determine the arrival time of each of the chunks of the content. The computing device 204 may utilize the arrival time of each of the chunks of the content, as well as the time that the source device encoded the content, to determine a difference between the wall clock of the computing device 204 and the clock of the source device. The drift control module may modify the wall clock of the computing device 204 based on this difference so that the wall clock of the computing device 204 is synchronized with the source device.

For example, the computing device 204 may determine a modified wall clock time that is not synchronized with the source device. For example, referring to the example above, the computing device 204 may determine the difference between the time that the chunks arrive and the time that the source device encoded the chunks. For example, the arrival time of the first chunk and the time that the first chunk was encoded by the source may have a difference of 50 ms. Similarly, the second chunk of content may have a difference of 50 ms between the time that the source encoded the chunk and the arrival time. The computing device 204 may utilize this difference to shift the clock of the computing device 204 such that the arrival time of the chunk matches the time that the source device encoded the content. Stated differently, the computing device 204 may add 50 ms to the wall clock of the computing device 204 such that the arrival time of the first and second chunk of content are the same as the time that the source device encoded the content. Thus, the wall clock of the computing device 204 may not actually be synchronized with the clock of the source of the content. Rather, the wall clock of the computing device may be modified (e.g., adjusted and/or shifted) to match the time the source device encoded the content. The wall clock of the computing device 204 may be modified so that the arrival time of the chunks of content will match the time that the source device encoded the chunks of content, even though the time that the chunks of content arrive at the computing device 204 is a different time at the source device. For example, a third chunk of content may arrive at 100 ms, which matches the time the source device encoded the chunk of content. However, the time at the source device when the third chunk of content actually arrives at the computing device 204 is actually higher than 100 ms because time has passed between the time that the source device encoded the chunk of content and sent the chunk of content to the computing device 204.

The drift control module 228 may determine a transmission duration of the chunk of the content based on the modified wall clock. For example, the drift control module 228 may utilize the modified wall clock (e.g., the synchronized wall clock) to determine the transmission duration of the chunk of the content in the modified wall clock time. That is, the drift control module 228 may determine the transmission duration of the chunk of the content relative to the time that the source of the content sent the chunk of the content.

The drift control module 228 may determine whether the transmission duration of the chunk of the content satisfies a threshold. For example, the drift control module 228 may compare the transmission duration of the chunk of the content to a media time of the chunk of content. The media time of the chunk of content may be the time that the content is displayed and/or encoded out. For example, the drift control module 228 may utilize the one or more media time stamps to determine a media time duration of the chunk of the content. Thus, by utilizing the modified wall clock, which is synchronized to the source of the content, the drift control module 228 may determine if a latency of the chunk of the content was limited by the bandwidth of a network that sent the chunk of content or if the latency of the chunk of the content was limited by the source of the content.

For example, if the transmission duration and a duration of the media time of the chunk of content are inside a threshold (e.g., do not satisfy the threshold) which indicates they are approximately the same, that indicates that the chunk of content was limited by the source of content because the chunk of content took as long to download the chunk of content as it took the source of the content to encode and transmit the chunk of content. Alternatively, if the transmission duration and the duration of the media time of the chunk of content are outside a threshold (e.g., satisfy a threshold), that indicates that the latency of the chunk of the content was limited by the bandwidth of the network because it took the computing device 204 longer to download the chunk of content than it took the source to encode and send the content. Accordingly, the drift control module 228 may determine whether the chunk of the content is network limited or source limited.

The drift control module 228 may determine a bitrate for a next chunk of the content may be based on the chunk of the content satisfying the threshold. For example, the drift control module 228 may determine based on whether the chunk of the content is network limited or source limited to utilize the chunk of the content in determining a bitrate. For example, if the chunk of content is network limited, the transmission duration of the chunk of content may be utilized, along with the size of the chunk of the content, to determine the bandwidth of the network. The drift control module 228 may determine a bitrate based on the bandwidth of the network. The drift control module 228 may only use chunks of content that are network limited to determine bandwidth of the network. For example, the chunks of content that are source limited do not accurately reflect the bandwidth of the network because the source is the cause of the bottleneck. Accordingly, the drift control module 228 may ignore (e.g., discard) chunks of content that are source limited when determining the bitrate for the next chunk of the content.

The drift control module 228 may receive a plurality of Ethernet frames. For example, the content may be received as a plurality of Ethernet frames. The first Ethernet frame may be received by a network interface card (e.g., the communication element 222) of the computing device 204. The first Ethernet frame may be the first frame of the chunk of content. The drift control module 228 may determine an arrival time of the first Ethernet frame. For example, the computing device 204 may time stamp when the first Ethernet frame is received by the computing device 204. For example, the network interface card may time stamp each Ethernet frame that is received. A second Ethernet frame having a second portion of the chunk of the content may be received by the computing device 204. The second Ethernet frame may be the end of the chunk of the content. The drift control module 228 may determine an arrival time of the second Ethernet frame. While Ethernet frames are used for ease of explanation, a person skilled in the art would appreciate that any data structure may be used. For example, IP packets may be used.

The drift control module 228 may determine a modified wall clock time. The modified wall clock time may be a time that is synchronized with a source of the chunk of content. The modified wall clock time may be determined based on the metadata of the chunk of the content. For example, the metadata of the chunk of the content may indicate a time that the source of the chunk of content encoded the chunk. The drift control module may determine, based on the duration of transmission of the chunk of the content, how much the wall clock needs to be modified to accurately reflect the time of the source of the content. Thus, the drift control module synchronizes the wall clock of the computing device 204 with a wall clock of the source of the content.

For example, the source device may encode the content with a time stamp that indicates the time that the content was encoded. The computing device 204 may receive two Ethernet frames that each indicate a respective time that the source device encoded the two Ethernet frames. The two Ethernet frames may be adjacent to each other in time. That is, the two Ethernet frames may be received one after the other. The computing device 204 may determine the arrival time of each of the Ethernet frames. The computing device 204 may utilize the arrival time of each of the Ethernet frames, as well as the time that the source device encoded the content, to determine a difference between the wall clock of the computing device 204 and the clock of the source device. The drift control module may modify the wall clock of the computing device 204 based on this difference so that the wall clock of the computing device 204 is synchronized with the source device.

For example, the computing device 204 may determine a modified wall clock time that is not synchronized with the source device. For example, referring to the example above, the computing device 204 204 may determine the difference between the time that the Ethernet frames arrive and the time that the source device encoded the Ethernet frames. For example, the arrival time of the first Ethernet frame and the time that the first Ethernet frame was encoded by the source may have a difference of 50 ms. Similarly, the second Ethernet frame may have a difference of 50 ms between the time that the source encoded the Ethernet frame and the arrival time. The computing device 204 may utilize this difference to shift the clock of the computing device 204 such that the arrival time of the Ethernet frames matches the time that the source device encoded the Ethernet frames. Stated differently, the computing device 204 may add 50 ms to the wall clock of the computing device 204 such that the arrival time of the first and second Ethernet frames are the same as the time that the source device encoded the Ethernet frames. Thus, the wall clock of the computing device 204 is not actually synchronized with the clock of the source of the content. Rather, the wall clock of the computing device 204 is modified (e.g., adjusted and/or shifted) to match the time the source device encoded the content. That is, the wall clock of the computing device 204 is modified so that the arrival time of the Ethernet frames will match the time that the source device encoded the Ethernet frames, even though the time that the Ethernet frames arrive at the computing device 204 is a different time at the source device. For example, a third Ethernet frame may arrive at 100 ms, which matches the time the source device encoded the Ethernet frame. However, the time at the source device when the third frame actually arrives at the computing device 204 may actually be higher/greater than 100 ms because time has passed between the time that the source device encoded the Ethernet frame and sent the Ethernet frame to the computing device 204.

The drift control module 228 may determine a transmission duration of the chunk of the content is determined based on the arrival time of the first Ethernet frame and the arrival time of the second Ethernet frame. For example, the first Ethernet frame may be the first frame of a plurality of frames of the chunk of content, and the second Ethernet frame may be the last frame of the plurality of frames of the chunk of content. Thus, the drift control module 228 may determine a transmission duration of the chunk of content based on the time that the first and last Ethernet frame were received.

The drift control module 228 may receive a complete access unit of content. The complete access unit of content may have metadata. The metadata may indicate one or more characteristics of the complete access unit of content. The computing device 204 204 may request the complete access unit of the content. For example, the computing device 204 may send a request to a source of the content (e.g., an encoder) indicating one or more characteristics of the requested content. For example, the computing device 204 may indicate a bitrate of the complete access unit of the content that the computing device 204 desires. The computing device 204 may utilize an adaptive bitrate (ABR) protocol when requesting the content.

The drift control module 228 may determine a clock reference based on the complete access unit of the content. For example, the drift control module 228 may determine the clock reference from the metadata of the complete access unit of the content. The drift control module 228 may determine one or more media time stamps based on the complete access unit of the content. For example, the metadata of the complete access unit of the content may have the one or more media time stamps.

The drift control module 228 may determine a modified wall clock time based on the metadata of the complete access unit of the content. For example, the metadata of the complete access unit of the content may indicate a time that the source of the complete access unit of content encoded the complete access unit. The drift control module 228 may determine, based on a duration of the complete access unit of the content, how much the wall clock needs to be modified to accurately reflect the time of the source of the content. Thus, the drift control module 228 synchronizes the wall clock of the computing device 204 with a wall clock of the source of the content.

For example, the source device may encode the content with a time stamp that indicates the time that the content was encoded. The computing device 204 may receive two complete access units of content that each indicate a respective time that the source device encoded the two complete access units of content. The two complete access units of content may be adjacent to each other in time. That is, the two complete access units of content may be received one after the other. The computing device 204 may determine the arrival time of each of the complete access units of the content. The computing device 204 may utilize the arrival time of each of the complete access units of the content, as well as the time that the source device encoded the content, to determine a difference between the wall clock of the computing device 204 and the clock of the source device. The drift control module may modify the wall clock of the computing device 204 based on this difference so that the wall clock of the computing device 204 is synchronized with the source device.

For example, the computing device 204 may determine a modified wall clock time that is not synchronized with the source device. For example, referring to the example above, the computing device 204 may determine the difference between the time that the complete access units arrive and the time that the source device encoded the complete access units. For example, the arrival time of the first complete access unit and the time that the first complete access unit was encoded by the source may have a difference of 50 ms. Similarly, the second complete access unit of content may have a difference of 50 ms between the time that the source encoded the chunk and the arrival time. The computing device 204 may utilize this difference to shift the clock of the computing device 204 204 such that the arrival time of the complete access units matches the time that the source device encoded the content. Stated differently, the computing device 204 may add 50 ms to the wall clock of the computing device 204 such that the arrival time of the first and second complete access units of content are the same as the time that the source device encoded the content. Thus, the wall clock of the computing device 204 is not actually synchronized with the clock of the source of the content. Rather, the wall clock of the computing device 204 is modified (e.g., adjusted and/or shifted) to match the time the source device encoded the content. That is, the wall clock of the computing device 204 is modified so that the arrival time of the complete access units of content will match the time that the source device encoded the chunks of content, even though the time that the chunks of content arrive at the computing device 204 is a different time at the source device. For example, a third complete access unit of content may arrive at 100 ms, which matches the time the source device encoded the complete access unit. However, the time at the source device when the third complete access unit of content actually arrives at the computing device 204 may be actually higher/greater than 100 ms because time has passed between the time that the source device encoded the complete access unit of content and sent the complete access unit of content to the computing device 204.

The drift control module 228 may determine a transmission duration of the complete access unit of the content based on the modified wall clock. For example, the drift control module 228 may utilize the modified wall clock (e.g., the synchronized wall clock) to determine the transmission duration of the complete access unit of the content in the modified wall clock time. That is, the drift control module 228 may determine the transmission duration of the complete access unit of the content relative to the time that the source of the content sent the complete access unit of the content.

The drift control module 228 may determine whether the transmission duration of the complete access unit of the content satisfies a threshold. For example, drift control module 228 may compare the transmission duration of the complete access unit of the content to a media time of the complete access unit of content. The media time of the complete access unit of content may be the time that the content is displayed and/or encoded out. For example, the drift control module 228 may utilize the one or more media time stamps to determine a media time duration of the complete access unit of the content. Thus, by utilizing the modified wall clock, which is synchronized to the source of the content, the drift control module 228 may determine if a latency of the complete access unit of the content was limited by the bandwidth of a network that sent the complete access unit of content or if the latency of the complete access unit of the content was limited by the source of the content.

For example, if the transmission duration and a duration of the media time of the complete access unit of content are inside a threshold (e.g., do not satisfy the threshold) approximately the same, that indicates that the complete access unit of content was limited by the source of content because the complete access unit of content took as long to download the complete access unit of content as it took the source of the content to encode and transmit the complete access unit of content. Alternatively, if the transmission duration and the duration of the media time of the complete access unit of content are outside a threshold (e.g., satisfy a threshold), that indicates that the latency of the complete access unit of the content was limited by the bandwidth of the network because it took the computing device 204 longer to download the complete access unit of content than it took the source to encode and send the content. Accordingly, the drift control module 228 may determine whether the complete access unit of the content is network limited or source limited.

The drift control module 228 may determine a bitrate for a next complete access unit of the content based on the complete access unit of the content satisfying the threshold. For example, the drift control module 228 may determine based on whether the complete access unit of the content is network limited or source limited to utilize the complete access unit of the content in determining a bitrate. For example, if the complete access unit of content is network limited, the transmission duration of the complete access unit of content may be utilized, along with the size of the complete access unit of the content, to determine the bandwidth of the network. The drift control module 228 may determine a bitrate based on the bandwidth of the network. The drift control module 228 may only use complete access units of content that are network limited to determine bandwidth of the network. For example, the complete access units of content that are source limited do not accurately reflect the bandwidth of the network because the source is the cause of the bottleneck. Accordingly, the drift control module 228 may ignore (e.g., discard) complete access units of content that are source limited when determining the bitrate for the next complete access unit of the content.

Figure 3:
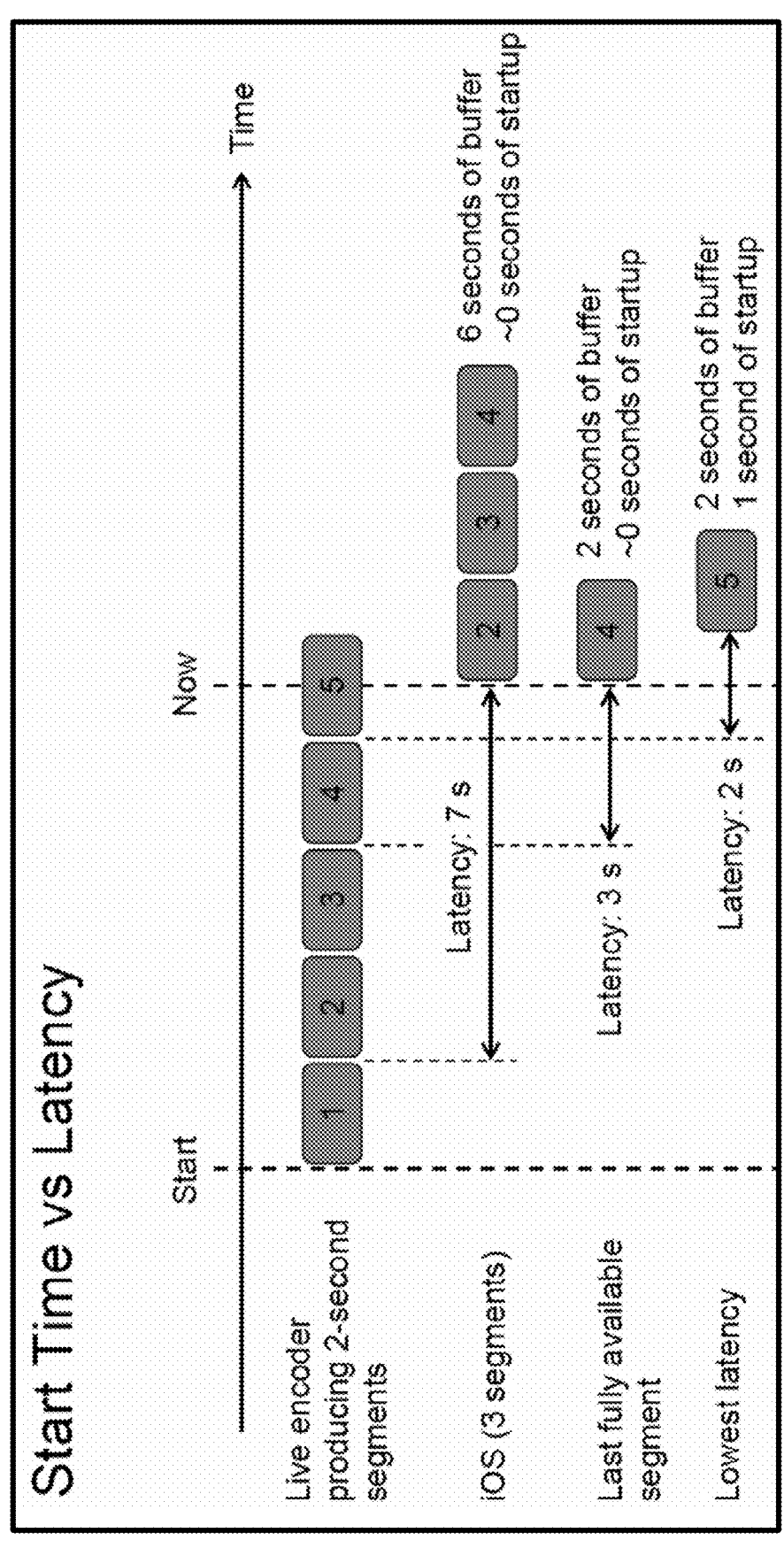
FIG. 3 shows an example of latency with streaming content.

FIG. 3 shows a graph 300 of latency with streaming content. Specifically, graph 300 shows the latency for a user device to receive content from the start of a live event based on the type of encoding protocol used.

Figure 4:
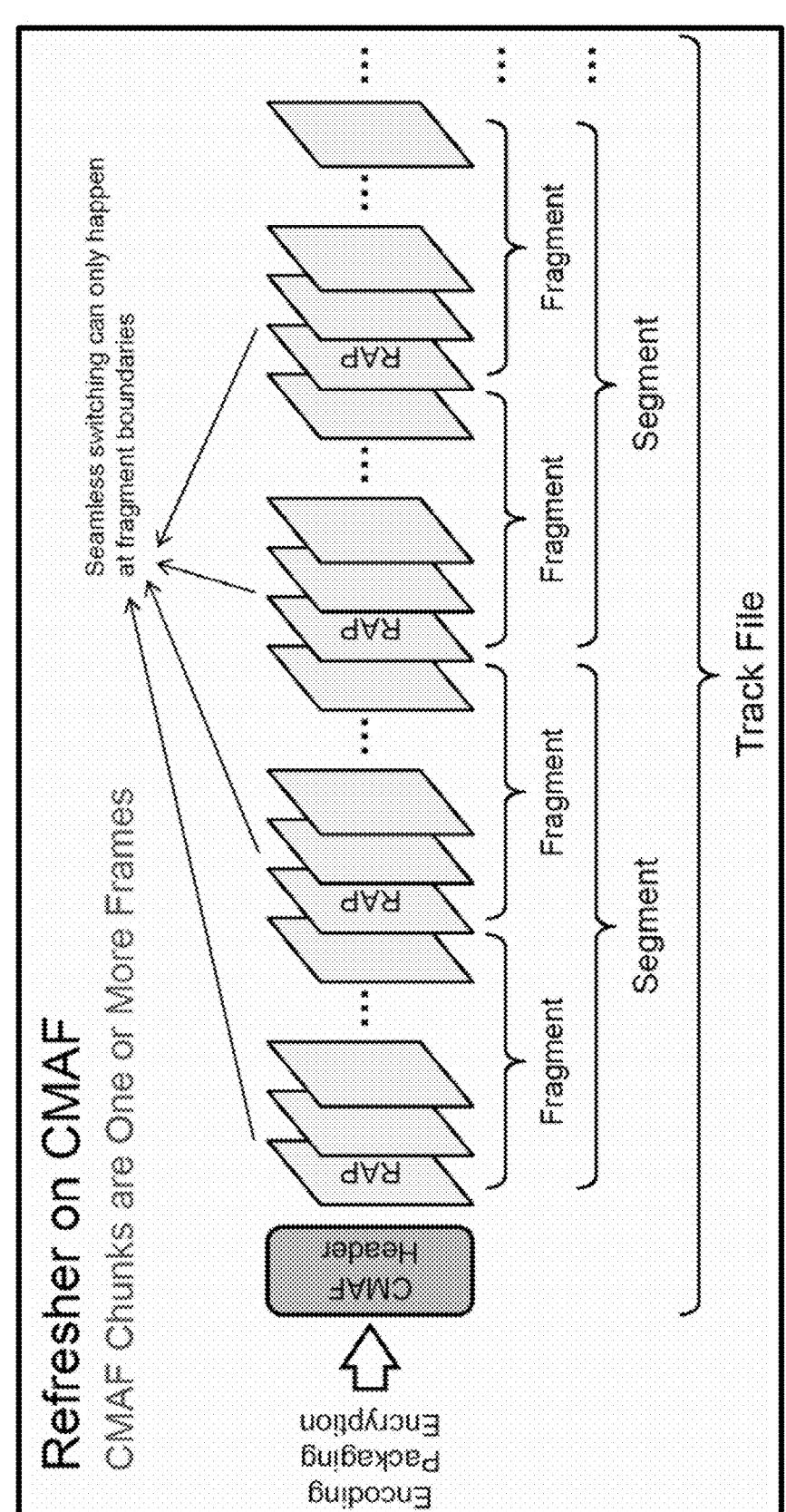
FIG. 4 shows an example of chunks of content.

FIG. 4 shows an example graph 400 of chunks of content 400. Specifically, the graph 400 shows a plurality of chunks of content that have a plurality of frames. Each of the frames may be grouped into a fragment of content. Each of the fragments of content may be grouped into a segment of content. The segments, fragments, and/or frames of content may be encoded together to produce a chunk of content.

Figure 5:
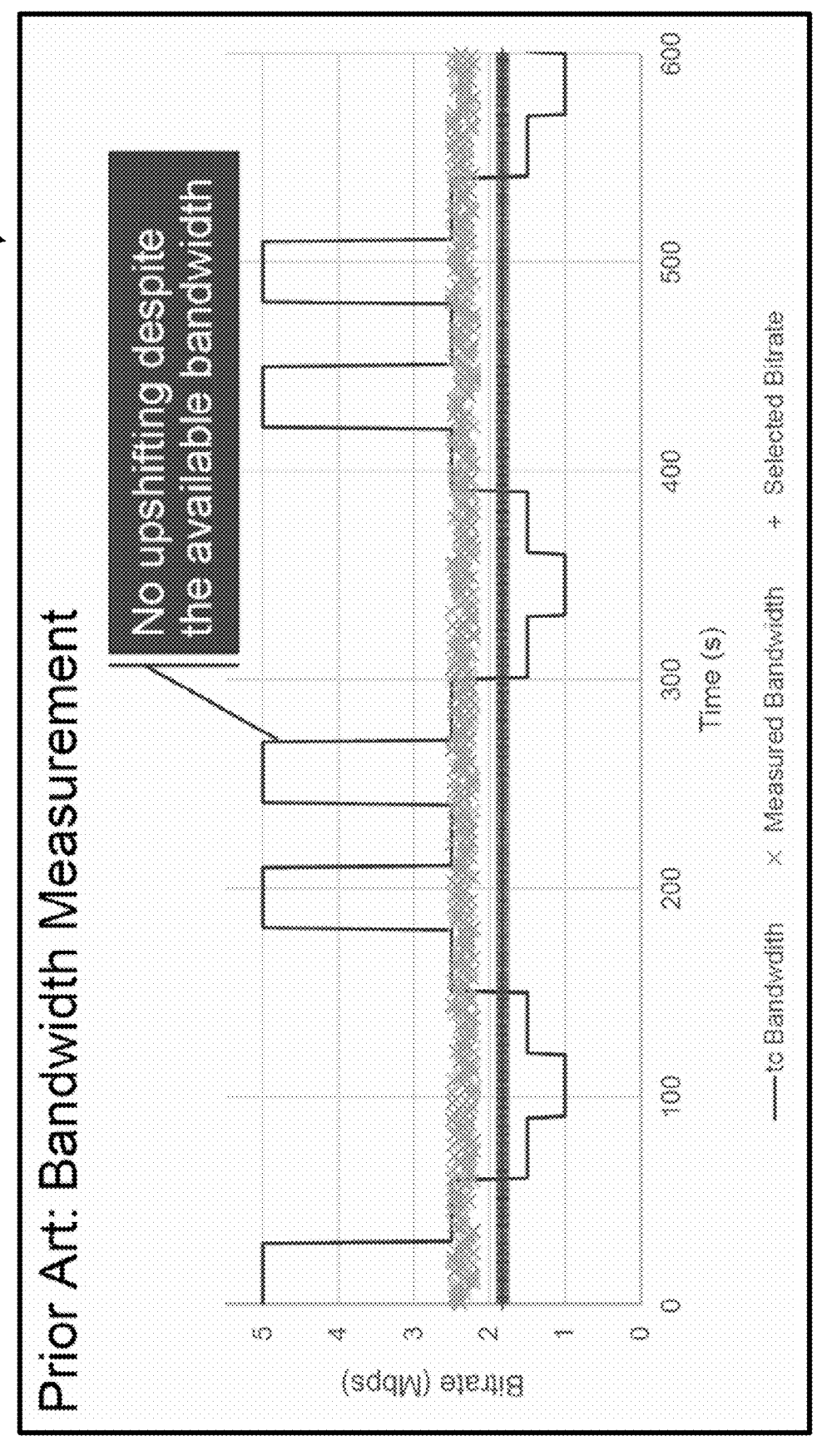
FIG. 5 shows an example of prior art bandwidth measurement.

FIG. 5 show an example graph 500 of prior art bandwidth measurement. Specifically, the graph 500 shows that the selected bitrate and measured bandwidth stay the same while streaming a content item, even though the actual bandwidth of the network has increased. Stated differently, even though the device receiving the content may be able to upshift to a higher bitrate because the network could support the additional bandwidth, the measured bandwidth does not accurately reflect the state of the network.

Figure 6:
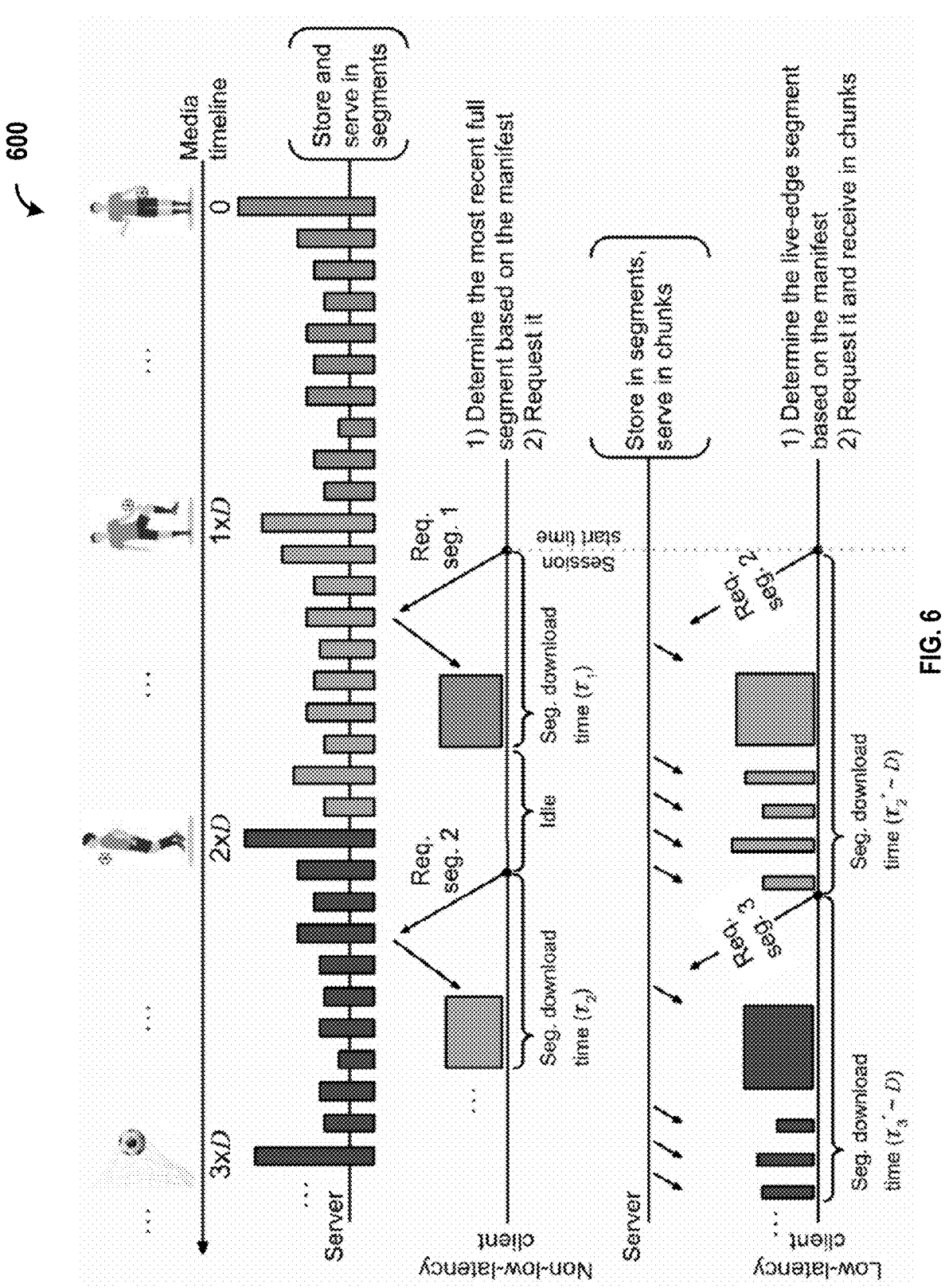
FIG. 6 shows an example of chunked content.

FIG. 6 show an example graph 600 of chunked content. Specifically, the graph 600 shows how the content may be broken into segments. The content may be a live event (e.g., a sporting event). The segments may be combined (e.g., by an encoder) into a chunk of content. The chunk of content may be provided to a user device. The encoder may reach point in providing the content of the live event that the encoder reaches a live edge segment of the live event. Thus, the chunks of content may be smaller and may be spaced out as compared to the original chunk sent to the user device.

Figure 7:
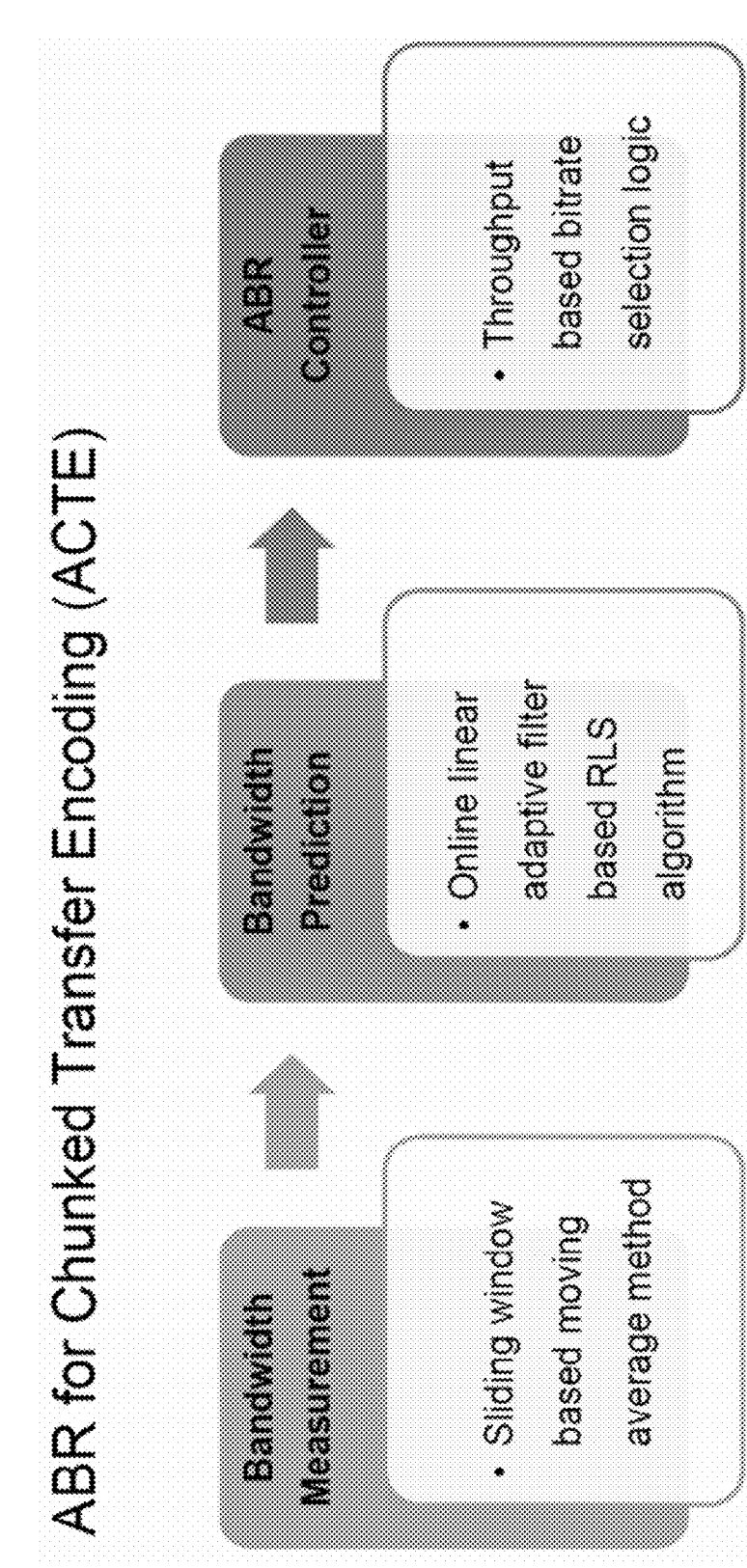
FIG. 7 shows an example of adaptive bitrate for chunked transfer encoding.

FIG. 7 shows an example flowchart 700 of adaptive bitrate for chunked transfer encoding. Specifically, the flowchart 700 determines a bandwidth measurement. For example, a sliding window based moving average method may be utilized to determine the bandwidth measurement. A bandwidth prediction may be determined. For example, an online linear adaptive filter based on a Recursive Least Squares (RLS) algorithm may be utilized to predict the bandwidth. An Adaptive Bitrate (ABR) controller may determine a bitrate for the device to request based on the bandwidth prediction. For example, the ABR controller may utilize a throughput based bitrate selection logic to determine the bitrate for the device.

Figure 8:
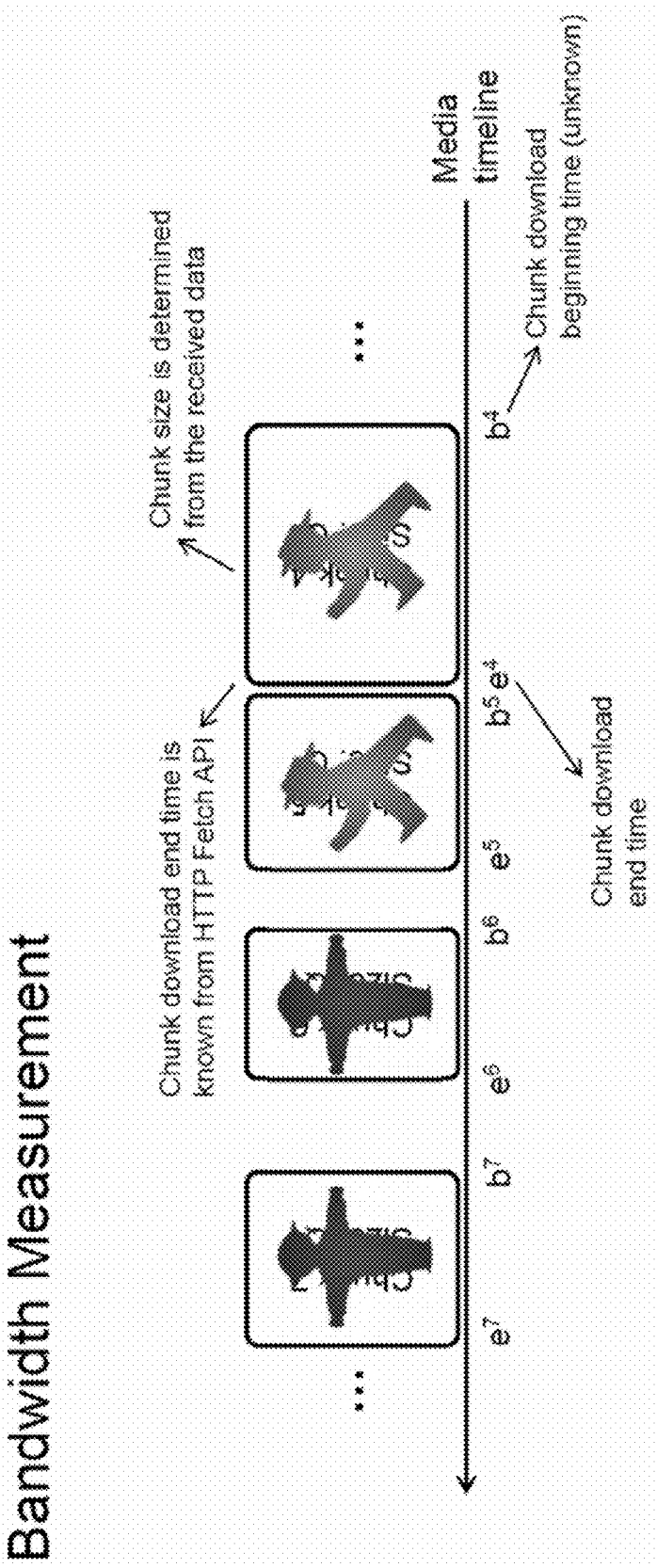
FIG. 8 shows an example of determining bandwidth of chunked content.

FIG. 8 shows an example graph 800 of determining bandwidth of chunked content. Specifically, the graph 800 shows how bandwidth measurement may be determined based on a size of a chunk of content and a time a download of the chunk ended. For example, the device may not know when the download of the chunk began. Accordingly, the device may utilize the size of the chunk and the download time to determine the bandwidth for the network.

FIG. 9 shows a flowchart of an example method 900 for low latency streaming. At 910, a chunk of content may be received by a computing device (e.g., by the user device 202 and/or the computing device 204 of FIG. 2). The content may include video content. The content may include a live event. The content may be displayed on a display device. The chunk of content may have metadata. The metadata may indicate one or more characteristics of the chunk of content. The computing device may request the chunk of the content. For example, the computing device may send a request to a source of the content (e.g., an encoder) indicating one or more characteristics of the requested content. For example, the computing device may indicate a bitrate of the chunk of the content that the computing device desires. The computing device may utilize an adaptive bitrate (ABR) protocol when requesting the content. The content may be delayed before being sent to the computing device in order to artificially prevent the content from being source limited. By delaying the content (e.g., live content) before it is sent, the source of the content has an opportunity to not be the bottleneck in the network. Additionally, the chunk size will change based on this delay which will facilitate determining whether future chunks are source limited or bandwidth limited.

At 920, a clock reference may be determined based on the chunk of the content. For example, the computing device may determine the clock reference from the metadata of the chunk of the content. The computing device may determine one or more media time stamps based on the chunk of the content. For example, the metadata of the chunk of the content may have the one or more media time stamps.

At 940, a modified time associated with the computing device may be determined. The computing device may determine the modified time associated with the computing device based on the clock reference and a time associated with the computing device. In an embodiment, the clock reference and a time associated with the computing device may be provided to the drift control module of the computing device and the drift module may determine the modified time. For example, the computing device may provide the clock reference and the time associated with the computing device to the drift control module. In an embodiment, the time associated with the computing device may be based on and/or include an internal clock time of the computing device. The computing device may determine the time associated with the computing device from the internal clock of the computing device. In an embodiment, the time associated with the computing device may be and/or include a wall clock time of the computing device. The computing device may determine the time associated with the computing device from a wall clock of the computing device.

In an embodiment, the modified time associated with the computing device may be a modified internal clock time of the computing device. In an embodiment, the modified time associated with the computing device may be a modified wall clock time of the computing device. The modified time may be a time that is synchronized with a source of the chunk of content. The modified time may be determined based on the metadata of the chunk of the content. For example, the metadata of the chunk of the content may indicate a time that the source of the chunk of content encoded the chunk. The drift control module may determine, based on a duration of the chunk of the content, how much the time associated with the computing device needs to be modified to accurately reflect the time of the source of the content. Thus, the drift control module synchronizes the time associated with the computing device with a time associated with the source of the content, such as an internal clock of the source of the content and/or a wall clock of the source of the content.

For example, the source device may encode the content with a time stamp that indicates the time that the content was encoded. The computing device may receive two chunks of content that each indicate a respective time that the source device encoded the two chunks of content. The two chunks of content may be adjacent to each other in time. That is, the two chunks of content may be received one after the other. The computing device may determine the arrival time of each of the chunks of the content. The computing device may utilize the arrival time of each of the chunks of the content, as well as the time that the source device encoded the content, to determine a difference between the time associated with the computing device and the clock of the source device. The drift control module may modify the time associated with the computing device based on this difference so that the time associated with the computing device is synchronized with the source device.

For example, the computing device may determine a modified time associated with the computing device that is not synchronized with the source device. For example, referring to the example above, the computing device may determine the difference between the time that the chunks arrive and the time that the source device encoded the chunks. For example, the arrival time of the first chunk and the time that the first chunk was encoded by the source may have a difference of 50 ms. Similarly, the second chunk of content may have a difference of 50 ms between the time that the source encoded the chunk and the arrival time. The computing device may utilize this difference to shift the clock of the computing device such that the arrival time of the chunk matches the time that the source device encoded the content. Stated differently, the computing device may add 50 ms to the time associated with the computing device such that the arrival time of the first and second chunk of content are the same as the time that the source device encoded the content. Thus, the time associated with the computing device is not actually synchronized with the clock of the source of the content. Rather, the time associated with the computing device is modified (e.g., adjusted and/or shifted) to match the time the source device encoded the content. That is, the time associated with the computing device is modified so that the arrival time of the chunks of content will match the time that the source device encoded the chunks of content, even though the time that the chunks of content arrive at the computing device is a different time at the source device. For example, a third chunk of content may arrive at 100 ms, which matches the time the source device encoded the chunk of content. However, the time at the source device when the third chunk of content actually arrives at the computing device is actually higher than 100 ms because time has passed between the time that the source device encoded the chunk of content and sent the chunk of content to the computing device.

At 950, a transmission duration of the chunk of the content may be determined based on the modified time associated with the computing device. For example, the computing device may utilize the modified time (e.g., the synchronized internal clock, the synchronized wall clock, etc.) to determine the transmission duration of the chunk of the content in the modified time. That is, the computing device may determine the transmission duration of the chunk of the content relative to the time that the source of the content sent the chunk of the content.

At 960, it may be determined that that a bitrate for the chunk of the content is network limited. The computing device may determine that the bitrate for the chunk of the content is network limited based on the transmission duration of the chunk of the content satisfying a threshold. The computing device may determine that the transmission duration of the chunk of the content satisfies the threshold. For example, the computing device may compare the transmission duration of the chunk of the content to a media time of the chunk of content. The media time of the chunk of content may be the time that the content is displayed and/or encoded out. For example, the computing device may utilize the one or more media time stamps to determine a media time duration of the chunk of the content. Thus, by utilizing the modified time associated with the computing device, which is synchronized to the source of the content, the computing device may determine if a latency of the chunk of the content was limited by the bandwidth of a network that sent the chunk of content or if the latency of the chunk of the content was limited by the source of the content. For example, if the transmission duration and a duration of the media time of the chunk of content are inside a threshold (e.g., do not satisfy the threshold) approximately the same, that indicates that the chunk of content was limited by the source of content because the chunk of content took as long to download the chunk of content as it took the source of the content to encode and transmit the chunk of content. Alternatively, if the transmission duration and the duration of the media time of the chunk of content are outside a threshold (e.g., satisfy a threshold), that indicates that the latency of the chunk of the content was limited by the bandwidth of the network because it took the computing device longer to download the chunk of content than it took the source to encode and send the content. Accordingly, the computing device may determine whether the chunk of the content is network limited or source limited. The computing device may determine whether the chunk of the content is network limited or source limited. Based on whether the chunk of the content is network limited or source limited, the computing device may use the chunk of the content to determine a bitrate.

At 970, a bitrate for a next chunk of the content may be determined. The bitrate for the next chunk of the content may be determined based on the bitrate for the chunk of the content being network limited. For example, if the chunk of content is network limited, the transmission duration of the chunk of content may be utilized, along with the size of the chunk of the content, to determine the bandwidth of the network. The computing device may determine a bitrate based on the bandwidth of the network. The computing device may only use chunks of content that are network limited to determine bandwidth of the network. For example, the chunks of content that are source limited do not accurately reflect the bandwidth of the network because the source is the cause of the bottleneck. Accordingly, the computing device may ignore (e.g., discard) chunks of content that are source limited when determining the bitrate for the next chunk of the content.

FIG. 10 shows a flowchart of an example method 1000 for low latency streaming. At 1010, a first IP Packet (e.g., Ethernet frame) that includes a first portion of a chunk of content and a second IP Packet (e.g., Ethernet frame) that includes a second portion of the chunk of content may be received by a computing device (e.g., by the user device 202 and/or the computing device 204 of FIG. 2). The second Ethernet frame may be the end of the chunk of the content.

The content may include video content. The content may include a live event. The content may be displayed on a display device. The chunk of content may have metadata. The metadata may indicate one or more characteristics of the chunk of content. The computing device may request the chunk of the content. For example, the computing device may send a request to a source of the content (e.g., an encoder) indicating one or more characteristics of the requested content. For example, the computing device may indicate a bitrate of the chunk of the content that the computing device desires. The computing device may utilize an adaptive bitrate (ABR) protocol when requesting the content. The first Ethernet frame may be received by a network interface card of the computing device. The first Ethernet frame may be the first frame of the chunk of content. The content may be delayed before being sent to the computing device in order to artificially prevent the content from being source limited. That is, by delaying the content (e.g., live content) before it is sent, the source of the content has an opportunity to not be the bottleneck in the network. Additionally, the chunk size will change based on this delay which will facilitate determining whether future chunks are source limited or bandwidth limited.

At 1020, an arrival time of the first IP and an arrival time of the second IP packet may be determined. For example, the computing device may time stamp when the first and second Ethernet frames are received by the computing device. For example, the network interface card may time stamp each Ethernet frame that is received.

At 1030, a transmission duration of the chunk of the content is determined based on the arrival time of the first IP Packet and the arrival time of the second IP Packet. For example, the first Ethernet frame may be the first frame of a plurality of frames of the chunk of content, and the second Ethernet frame may be the last frame of the plurality of frames of the chunk of content. Thus, the computing device may determine a transmission duration of the chunk of content based on the time that the first and last Ethernet frame were received.

At 1040, a modified time associated with the computing device may be determined. The computing device may determine the modified time. In an embodiment, a drift control module of the computing device may determine the modified time. In an embodiment, the modified time associated with the computing device may be based on and/or include a modified internal clock time of the computing device. In an embodiment, the modified time associated with the computing device may be based on and/or include a modified wall clock time of the computing device. The modified time may be a time that is synchronized with a source of the chunk of content. The modified time may be determined based on the metadata of the chunk of the content. For example, the metadata of the chunk of the content may indicate a time that the source of the chunk of content encoded the chunk. The drift control module may determine, based on the duration of transmission of the chunk of the content, how much a time associated with the computing device (e.g., an internal clock, a wall clock, etc.) needs to be modified to accurately reflect the time of the source of the content. The drift control module may synchronize the time associated with the computing device with a time associated with the source of the content (e.g., an internal clock of the source of the content, a wall clock of the source of the content, etc.).

For example, the source device may encode the content with a time stamp that indicates the time that the content was encoded. The computing device may receive two Ethernet frames that each indicate a respective time that the source device encoded the two Ethernet frames. The two Ethernet frames may be adjacent to each other in time. That is, the two Ethernet frames may be received one after the other. The computing device may determine the arrival time of each of the Ethernet frames. The computing device may utilize the arrival time of each of the Ethernet frames, as well as the time that the source device encoded the content, to determine a difference between the time associated with the computing device and the clock of the source device. The drift control module may modify the time associated with the computing device based on this difference so that the time associated with the computing device is synchronized with the source device. While Ethernet frames are used for ease of explanation, a person skilled in the art would appreciate that any data structure may be used. For example, IP packets may be used.

For example, the computing device may determine a modified time associated with the computing device that is not synchronized with the source device. For example, referring to the example above, the computing device may determine the difference between the time that the Ethernet frames arrive and the time that the source device encoded the Ethernet frames. For example, the arrival time of the first Ethernet frame and the time that the first Ethernet frame was encoded by the source may have a difference of 50 ms. Similarly, the second Ethernet frame may have a difference of 50 ms between the time that the source encoded the Ethernet frame and the arrival time. The computing device may utilize this difference to shift the clock of the computing device such that the arrival time of the Ethernet frames matches the time that the source device encoded the Ethernet frames. Stated differently, the computing device may add 50 ms to the w time associated with the computing device such that the arrival time of the first and second Ethernet frames are the same as the time that the source device encoded the Ethernet frames. Thus, the time associated with the computing device is not actually synchronized with the clock of the source of the content. Rather, the time associated with the computing device is modified (e.g., adjusted and/or shifted) to match the time the source device encoded the content. That is, the time associated with the computing device is modified so that the arrival time of the Ethernet frames will match the time that the source device encoded the Ethernet frames, even though the time that the Ethernet frames arrive at the computing device is a different time at the source device. For example, a third Ethernet frame may arrive at 100 ms, which matches the time the source device encoded the Ethernet frame. However, the time at the source device when the third frame actually arrives at the computing device is actually higher than 100 ms because time has passed between the time that the source device encoded the Ethernet frame and sent the Ethernet frame to the computing device.

At 1050, it may be determined that a bitrate for the chunk of the content is network limited. The computing device may determine that a bitrate for the chunk of the content is network limited based on the transmission duration of the chunk of the content satisfying a threshold. For example, the computing device may compare the transmission duration of the chunk of the content to a media time of the chunk of content. The media time of the chunk of content may be the time that the content is displayed and/or encoded out. For example, the computing device may utilize the one or more media time stamps to determine a media time duration of the chunk of the content. Thus, by utilizing the modified time associated with the computing device, which is synchronized to the source of the content, the computing device may determine if a latency of the chunk of the content was limited by the bandwidth of a network that sent the chunk of content or if the latency of the chunk of the content was limited by the source of the content. For example, if the transmission duration and a duration of the media time of the chunk of content are inside a threshold (e.g., do not satisfy the threshold) approximately the same, that indicates that the chunk of content was limited by the source of content because the chunk of content took as long to download the chunk of content as it took the source of the content to encode and transmit the chunk of content. Alternatively, if the transmission duration and the duration of the media time of the chunk of content are outside a threshold (e.g., satisfy a threshold), that indicates that the latency of the chunk of the content was limited by the bandwidth of the network because it took the computing device longer to download the chunk of content than it took the source to encode and send the content. Accordingly, the computing device may be configured to determine whether the chunk of the content is network limited or source limited.

At 1060, a bitrate for a next chunk of the content may be determined. The computing device may determine the bitrate for the next chunk of the content based on the bitrate for the chunk of the content being network limited. For example, the computing device may determine based on whether the chunk of the content is network limited or source limited to utilize the chunk of the content in determining a bitrate. For example, when the chunk of content is network limited, the transmission duration of the chunk of content may be utilized, along with the size of the chunk of the content, to determine the bandwidth of the network. The computing device may determine a bitrate based on the bandwidth of the network. The computing device may only use chunks of content that are network limited to determine bandwidth of the network. For example, the chunks of content that are source limited do not accurately reflect the bandwidth of the network because the source is the cause of the bottleneck. Accordingly, the computing device may ignore (e.g., discard) chunks of content that are source limited when determining the bitrate for the next chunk of the content.

FIG. 11 shows a flowchart of an example method 1100 for low latency streaming. At 1110, a complete access unit of content is received by a computing device (e.g., by the user device 202 and/or the computing device 204 of FIG. 2). The content may be video content. The content may be a live event. The content may be displayed on a display device. The complete access unit of content may have metadata. The metadata may indicate one or more characteristics of the complete access unit of content. The computing device may request the complete access unit of the content. For example, the computing device may send a request to a source of the content (e.g., an encoder) indicating one or more characteristics of the requested content. For example, the computing device may indicate a bitrate of the complete access unit of the content that the computing device desires. The computing device may utilize an adaptive bitrate (ABR) protocol when requesting the content. The content may be delayed before being sent to the computing device in order to artificially prevent the content from being source limited. That is, by delaying the content (e.g., live content) before it is sent, the source of the content has an opportunity to not be the bottleneck in the network. Additionally, the chunk size will change based on this delay which will facilitate determining whether future chunks are source limited or bandwidth limited.

At 1120, a clock reference may be determined based on the complete access unit of the content. For example, the computing device may determine the clock reference from the metadata of the complete access unit of the content. The computing device may determine one or more media time stamps based on the complete access unit of the content. For example, the metadata of the complete access unit of the content may have the one or more media time stamps.

At 1130, a modified time associated with the computing device (e.g., a modified internal clock time, a modified wall clock time, etc.) may be determined. The computing device may determine the modified time based on the clock reference and a time associated with the computing device. In an embodiment, the computing device may provide the clock reference and the time associated with the computing device to a drift control module of the computing device. In an embodiment, the time associated with the computing device may be based on and/or include an internal clock time of the computing device. The computing device may determine the time associated with the computing device from the internal clock of the computing device. In an embodiment, the time associated with the computing device may be and/or include a wall clock time of the computing device. The computing device may determine the time associated with the computing device from a wall clock of the computing device.

The modified time may be a time that is synchronized with a source of the complete access unit of content. The modified time may be determined based on the metadata of the complete access unit of the content. For example, the metadata of the complete access unit of the content may indicate a time that the source of the complete access unit of content encoded the complete access unit. The drift control module may determine, based on a duration of the complete access unit of the content, how much the time associated with the computing device needs to be modified to accurately reflect the time of the source of the content. Thus, the drift control module synchronizes the wall clock of the computing device with a wall clock of the source of the content.

For example, the source device may encode the content with a time stamp that indicates the time that the content was encoded. The computing device may receive two complete access units of content that each indicate a respective time that the source device encoded the two complete access units of content. The two complete access units of content may be adjacent to each other in time. That is, the two complete access units of content may be received one after the other. The computing device may determine the arrival time of each of the complete access units of the content. The computing device may utilize the arrival time of each of the complete access units of the content, as well as the time that the source device encoded the content, to determine a difference between the time associated with the computing device and the clock of the source device. The drift control module may modify the time associated with the computing device based on this difference so that the time associated with the computing device is synchronized with the source device.

For example, the computing device may determine a modified time associated with the computing device that is not synchronized with the source device. For example, referring to the example above, the computing device may determine the difference between the time that the complete access units arrive and the time that the source device encoded the complete access units. For example, the arrival time of the first complete access unit and the time that the first complete access unit was encoded by the source may have a difference of 50 ms. Similarly, the second complete access unit of content may have a difference of 50 ms between the time that the source encoded the chunk and the arrival time. The computing device may utilize this difference to shift the clock associated with the computing device such that the arrival time of the complete access units matches the time that the source device encoded the content. Stated differently, the computing device may add 50 ms to the time associated with the computing device such that the arrival time of the first and second complete access units of content are the same as the time that the source device encoded the content. Thus, the time associated with the computing device is not actually synchronized with the clock of the source of the content. Rather, the time associated with the computing device is modified (e.g., adjusted and/or shifted) to match the time the source device encoded the content. That is, the time associated with the computing device is modified so that the arrival time of the complete access units of content will match the time that the source device encoded the chunks of content, even though the time that the chunks of content arrive at the computing device is a different time at the source device. For example, a third complete access unit of content may arrive at 100 ms, which matches the time the source device encoded the complete access unit. However, the time at the source device when the third complete access unit of content actually arrives at the computing device is actually higher than 100 ms because time has passed between the time that the source device encoded the complete access unit of content and sent the complete access unit of content to the computing device.

At 1140, a transmission duration of the complete access unit of the content may be determined based on the modified time associated with the computing device. For example, the computing device may utilize the modified time associated with the computing device to determine the transmission duration of the complete access unit of the content in the modified time. That is, the computing device may determine the transmission duration of the complete access unit of the content relative to the time that the source of the content sent the complete access unit of the content.

At 1150, a bitrate for the complete access unit may be determined to be network limited. The computing device may determine that the bitrate for the complete access unit is network limited based on the transmission duration of the complete access unit satisfying a threshold. For example, the computing device may compare the transmission duration of the complete access unit of the content to a media time of the complete access unit of content. The media time of the complete access unit of content may be the time that the content is displayed and/or encoded out. For example, the computing device may utilize the one or more media time stamps to determine a media time duration of the complete access unit of the content. Thus, by utilizing the modified time (e.g., the modified internal clock, the modified wall clock, etc.), which is synchronized to the source of the content, the computing device may determine when a latency of the complete access unit of the content is limited by the bandwidth of a network that sent the complete access unit of content or when the latency of the complete access unit of the content is limited by the source of the content.

For example, if the transmission duration and a duration of the media time of the complete access unit of content are inside a threshold (e.g., do not satisfy the threshold) approximately the same, that indicates that the complete access unit of content was limited by the source of content because the complete access unit of content took as long to download the complete access unit of content as it took the source of the content to encode and transmit the complete access unit of content. Alternatively, if the transmission duration and the duration of the media time of the complete access unit of content are outside a threshold (e.g., satisfy a threshold), that indicates that the latency of the complete access unit of the content was limited by the bandwidth of the network because it took the computing device longer to download the complete access unit of content than it took the source to encode and send the content. Accordingly, the computing device may be configured to determine whether the complete access unit of the content is network limited or source limited.

At 1160, a bitrate for a next complete access unit of the content may be determined. The computing device may determine the bitrate for the next complete access unit of the content based on the complete access unit of the content satisfying the threshold. For example, the computing device may determine based on whether the complete access unit of the content is network limited or source limited to utilize the complete access unit of the content in determining a bitrate. For example, if the complete access unit of content is network limited, the transmission duration of the complete access unit of content may be utilized, along with the size of the complete access unit of the content, to determine the bandwidth of the network. The computing device may determine a bitrate based on the bandwidth of the network. The computing device may only use complete access units of content that are network limited to determine bandwidth of the network. For example, the complete access units of content that are source limited do not accurately reflect the bandwidth of the network because the source is the cause of the bottleneck. Accordingly, the computing device may ignore (e.g., discard) complete access units of content that are source limited when determining the bitrate for the next complete access unit of the content.

Figure 12:
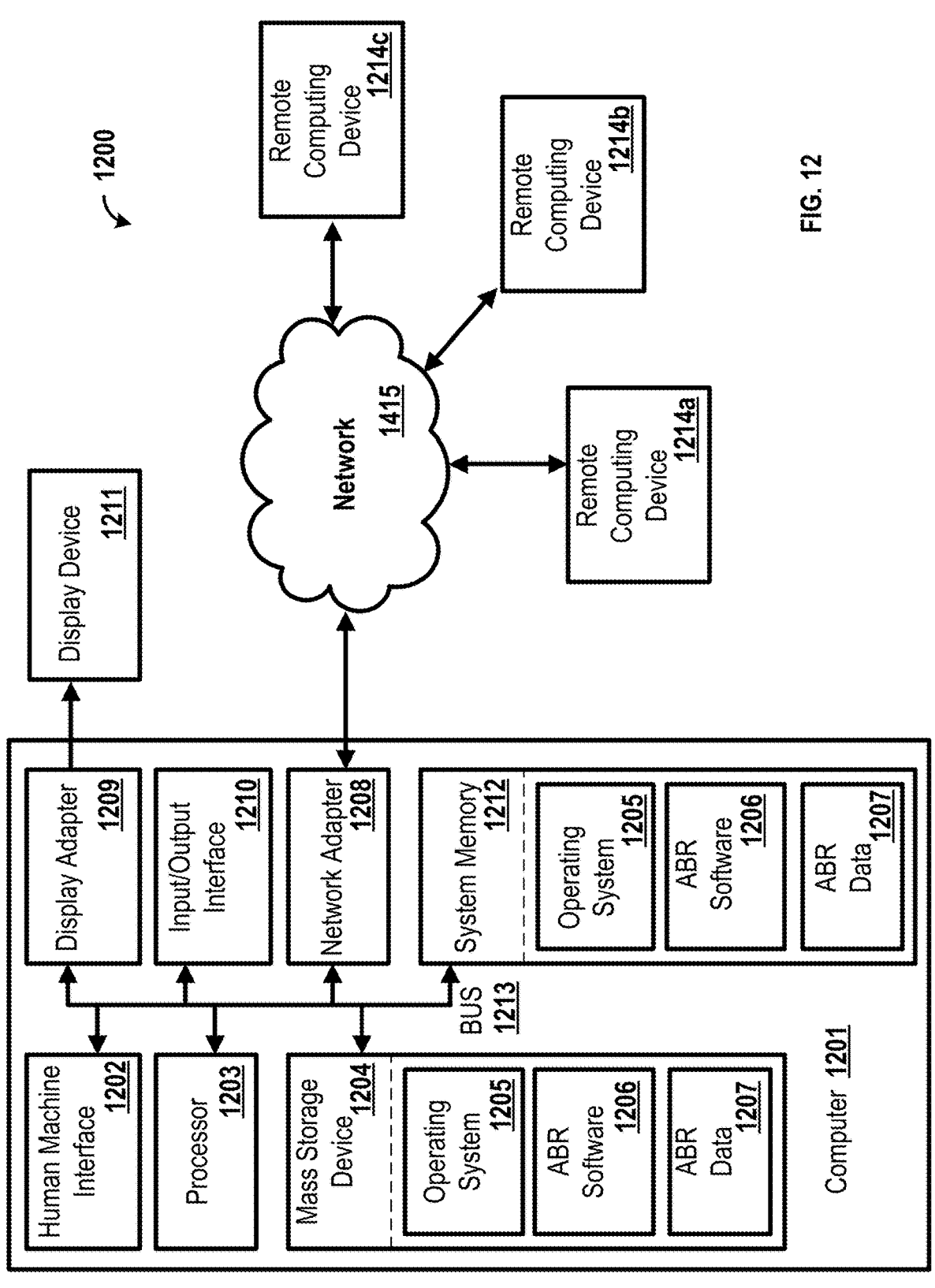
FIG. 12 shows a block diagram of a computing device.

FIG. 12 shows a block diagram 1200 of a computing device 1201. The server 110, the application server 126, the content source 127, and/or the edge device 128 of FIG. 1 may be a computer as shown in FIG. 12. The media device 120, the communication terminal 122, and/or the mobile device 124 of FIG. 1 may be a computer as shown in FIG. 12. The user device 202 and/or the computing device 204 may be a computer as shown in FIG. 12.

The computer 1201 may comprise one or more processors 1203, a system memory 1212, and a bus 1213 that couples various system components including the one or more processors 1203 to the system memory 1212. In the case of multiple processors 1203, the computer 1201 may utilize parallel computing.

The bus 1213 is one or more of several possible types of bus structures, including a memory bus or memory controller, a peripheral bus, an accelerated graphics port, or local bus using any of a variety of bus architectures.

The computer 1201 may operate on and/or comprise a variety of computer readable media (e.g., non-transitory). The readable media may be any available media that is accessible by the computer 1201 and may include both volatile and non-volatile media, removable and non-removable media. The system memory 1212 may have computer readable media in the form of volatile memory, such as random access memory (RAM), and/or non-volatile memory, such as read only memory (ROM). The system memory 1212 may store data such as the mitigation data 1207 and/or program modules such as the operating system 1205 and the mitigation software 1206 that are accessible to and/or are operated on by the one or more processors 1203.

The computer 1201 may also have other removable/non-removable, volatile/non-volatile computer storage media. FIG. 12 shows the mass storage device 1204 which may provide non-volatile storage of computer code, computer readable instructions, data structures, program modules, and other data for the computer 1201. The mass storage device 1204 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules may be stored on the mass storage device 1204, such as the operating system 1205 and the mitigation software 1206. Each of the operating system 1205 and the mitigation software 1206 (or some combination thereof) may have elements of the program modules and the mitigation software 1206. The mitigation data 1207 may also be stored on the mass storage device 1204. The mitigation data 1207 may be stored in any of one or more databases known in the art. Such databases may be DB2®, Microsoft® Access, Microsoft® SQL Server, Oracle®, MySQL, PostgreSQL, and the like. The databases may be centralized or distributed across locations within the network 1215.

A user may enter commands and information into the computer 1201 via an input device (not shown). The input device may be, but not limited to, a keyboard, pointing device (e.g., a computer mouse, remote control, a touchpad), a microphone, a joystick, a scanner, tactile input devices such as gloves, and other body coverings, motion sensor, and the like These and other input devices may be connected to the one or more processors 1203 via a human machine interface 1202 that may be coupled to the bus 1213, but may be connected by other interface and bus structures, such as a parallel port, game port, an IEEE 1394 Port (also known as a Firewire port), a serial port, network adapter 1208, and/or a universal serial bus (USB).

The display device 1211 may also be connected to the bus 1213 via an interface, such as the display adapter 1209. It is contemplated that the computer 1201 may have more than one display adapter 1209 and the computer 1201 may have more than one display device 1211. The display device 1211 may be a monitor, an LCD (Liquid Crystal Display), light emitting diode (LED) display, television, smart lens, smart glass, and/or a projector. In addition to the display device 1211, other output peripheral devices may be components such as speakers (not shown) and a printer (not shown) which may be connected to the computer 1201 via the Input/Output Interface 1210. Any step and/or result of the methods may be output (or caused to be output) in any form to an output device. Such output may be any form of visual representation, including, but not limited to, textual, graphical, animation, audio, tactile, and the like. The display device 1211 and computer 1201 may be part of one device, or separate devices.

The computer 1201 may operate in a networked environment using logical connections to one or more remote computing devices 1214a,b,c. A remote computing device may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device, and so on. Logical connections between the computer 1201 and a remote computing device 1214a,b,c may be made via a network 1215, such as a local area network (LAN) and/or a general wide area network (WAN). Such network connections may be through the network adapter 1208. The network adapter 1208 may be implemented in both wired and wireless environments. Such networking environments are conventional and commonplace in dwellings, offices, enterprise-wide computer networks, intranets, and the Internet. For example, the computer 1201 may communicate with the remote computing devices 1214a,b,c via one or more communication protocols such as infrared (IR) communication, Zigbee, or Bluetooth.

Application programs and other executable program components such as the operating system 1205 are shown herein as discrete blocks, although it is recognized that such programs and components reside at various times in different storage components of the computing device 1201, and are executed by the one or more processors 1203 of the computer. An implementation of the mitigation software 1206 may be stored on or sent across some form of computer readable media. Any of the described methods may be performed by processor-executable instructions embodied on computer readable media.

While specific configurations have been described, it is not intended that the scope be limited to the particular configurations set forth, as the configurations herein are intended in all respects to be possible configurations rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

The invention claimed is:

1. A method comprising:
   determining, based on a first chunk of content at a first bitrate and based on a clock associated with a source of the first chunk of the content, a clock reference;
   determining, based on the clock reference and a first time associated with a destination of the first chunk of the content, a transmission duration for the first chunk of the content; and
   causing, based on the transmission duration for the first chunk satisfying a threshold, generation of a second chunk of the content at a second bitrate different from the first bitrate.

2. The method of claim 1, further comprising determining, based on the clock reference and the first time, a second time, wherein the transmission duration is further based on the second time.

3. The method of claim 1, wherein the transmission duration satisfying the threshold indicates a transmission of the first chunk of the content is network limited.

4. The method of claim 1, further comprising:
   determining, based on a size of the first chunk of the content and the transmission duration of the first chunk of the content, a bandwidth of a network; and
   determining, based on the bandwidth of the network, the second bitrate.

5. The method of claim 1, wherein determining the transmission duration satisfies the threshold comprises:
   determining, based on one or more media time stamps associated with the first chunk, a media time duration of the first chunk of the content; and
   comparing the transmission duration of the first chunk of the content to the media time duration of the first chunk of the content, wherein the comparison indicates that the transmission duration satisfies the threshold.

6. The method of claim 1, wherein the source of the first chunk of the content comprises an encoder and wherein the encoder associates the clock reference with the first chunk of the content.

7. The method of claim 1, wherein the first chunk of content comprises an access unit and wherein the transmission duration is further based on the access unit.

8. The method of claim 1, wherein determining the clock reference comprises determining the clock reference from metadata associated with the first chunk of the content.

9. An apparatus comprising:
   one or more processors; and
   memory storing processor-executable instructions that, when executed by the one or more processors, cause the apparatus to:
      determine, based on a first chunk of content at a first bitrate and based on a clock associated with a source of the first chunk of the content, a clock reference;
      determine, based on the clock reference and a first time associated with the apparatus, a transmission duration for the first chunk of the content; and
      cause, based on the transmission duration for the first chunk satisfying a threshold, generation of a second chunk of the content at a second bitrate different from the first bitrate.

10. The apparatus of claim 9, wherein the processor-executable instructions, when executed by the one or more processors, further cause the apparatus to determine, based on the clock reference and the first time, a second time, wherein the transmission duration is further based on the second time.

11. The apparatus of claim 9, wherein the transmission duration satisfying the threshold indicates a transmission of the first chunk of the content is network limited.

12. The apparatus of claim 9, wherein the processor-executable instructions, when executed by the one or more processors, further cause the apparatus to:
   determine, based on a size of the first chunk of the content and the transmission duration of the first chunk of the content, a bandwidth of a network; and
   determine, based on the bandwidth of the network, the second bitrate.

13. The apparatus of claim 9, wherein the processor-executable instructions that, when executed by the one or more processors, cause the apparatus to determine that the transmission duration satisfies the threshold, cause the apparatus to:
   determine, based on one or more media time stamps associated with the first chunk, a media time duration of the first chunk of the content; and
   compare the transmission duration of the first chunk of the content to the media time duration of the first chunk of the content, wherein the comparison indicates that the transmission duration satisfies the threshold.

14. The apparatus of claim 9, wherein the source of the first chunk of the content comprises an encoder and wherein the encoder associates the clock reference with the first chunk of the content.

15. The apparatus of claim 9, wherein the first chunk of content comprises an access unit and wherein the transmission duration is further based on the access unit.

16. The apparatus of claim 9, wherein the processor-executable instructions that, when executed by the one or more processors, cause the apparatus to determine the clock reference, cause the apparatus to determine the clock reference from metadata associated with the first chunk of the content.

17. One or more non-transitory computer-readable media storing processor-executable instructions that, when executed by at least one processor, cause the at least one processor to:

determine, based on a first chunk of content at a first bitrate and based on a clock associated with a source of the first chunk of the content, a clock reference;

determine, based on the clock reference and a first time associated with the at least one processor, a transmission duration for the first chunk of the content; and cause, based on the transmission duration of the first chunk satisfying a threshold, generation of a second chunk of the content at a second bitrate different from the first bitrate.

18. The one or more non-transitory computer-readable media of claim 17, wherein the processor-executable instructions, when executed by the at least one processor, further cause the at least one processor to determine, based on the clock reference and the first time, a second time, wherein the transmission duration is further based on the second time.

19. The one or more non-transitory computer-readable media of claim 17, wherein the transmission duration satisfying the threshold indicates a transmission of the first chunk of the content is network limited.

20. The one or more non-transitory computer-readable media of claim 17, wherein the processor-executable instructions, when executed by the at least one processor, further cause the at least one processor to:

determine, based on a size of the first chunk of the content and the transmission duration of the first chunk of the content, a bandwidth of a network; and determine, based on the bandwidth of the network, the second bitrate.

21. The one or more non-transitory computer-readable media of claim 17, wherein the processor-executable instructions that, when executed by the at least one processor, cause the at least one processor to determine that the transmission duration satisfies the threshold, cause the at least one processor to:

determine, based on one or more media time stamps associated with the first chunk, a media time duration of the first chunk of the content; and compare the transmission duration of the first chunk of the content to the media time duration of the first chunk of the content, wherein the comparison indicates that the transmission duration satisfies the threshold.

22. The one or more non-transitory computer-readable media of claim 17, wherein the source of the first chunk of the content comprises an encoder and wherein the encoder associates the clock reference with the first chunk of the content.

23. The one or more non-transitory computer-readable media of claim 17, wherein the first chunk of content comprises an access unit and wherein the transmission duration is further based on the access unit.

24. The one or more non-transitory computer-readable media of claim 17, wherein the processor-executable instructions that, when executed by the at least one processor, cause the at least one processor to determine the clock reference, cause the at least one processor to determine the clock reference from metadata associated with the first chunk of the content.

25. A system comprising:

a computing device configured to:

determine, based on a first chunk of content at a first bitrate and based on a clock associated with a source computing device, a clock reference;

determine, based on the clock reference and a first time associated with the computing device, a transmission duration for the first chunk of the content; and cause, based on the transmission duration for the first chunk satisfying a threshold, generation of a second chunk of the content at a second bitrate different from the first bitrate; and the source computing device configured to:

send, to the computing device, the first chunk of the content.

26. The system of claim 25, wherein the computing device is further configured to determine, based on the clock reference and the first time, a second time, wherein the transmission duration is further based on the second time.

27. The system of claim 25, wherein the transmission duration satisfying the threshold indicates a transmission of the first chunk of the content being network limited.

28. The system of claim 25, wherein the computing device is further configured to:

determine, based on a size of the first chunk of the content and the transmission duration of the first chunk of the content, a bandwidth of a network; and determine, based on the bandwidth of the network, the second bitrate.

29. The system of claim 25, wherein to determine the transmission duration satisfies the threshold, the computing device is further configured to:

determine, based on one or more media time stamps associated with the first chunk, a media time duration of the first chunk of the content; and compare the transmission duration of the first chunk of the content to the media time duration of the first chunk of the content, wherein the comparison indicates that the transmission duration satisfies the threshold.

30. The system of claim 25, wherein the source computing device comprises an encoder and wherein the encoder associates the clock reference with the first chunk of the content.

31. The system of claim 25, wherein the first chunk of content comprises an access unit, wherein the transmission duration is further based on the access unit.

32. The system of claim 25, wherein to determine the clock reference, the computing device is configured to determine the clock reference from metadata associated with the first chunk of the content.

\* \* \* \* \*